US011740901B2

(12) United States Patent
Willenborg et al.

(10) Patent No.: US 11,740,901 B2
(45) Date of Patent: Aug. 29, 2023

(54) CENTRALIZED CONTROL OF EXECUTION OF QUANTUM PROGRAM

(71) Applicant: International Business Machines Corporation, Armonk, NY (US)

(72) Inventors: Scott Willenborg, Stewartville, MN (US); Andrew Wack, Millbrook, NY (US); Thomas Alexander, Halifax (CA); Jeffrey Joseph Ruedinger, Rochester, MN (US); Blake Johnson, Ossining, NY (US); Juergen Saalmueller, Holzgerlingen (DE); Kent H. Haselhorst, Spring Valley, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 245 days.

(21) Appl. No.: 17/348,232

(22) Filed: Jun. 15, 2021

(65) Prior Publication Data
US 2022/0398099 A1    Dec. 15, 2022

(51) Int. Cl.
G06F 9/30      (2018.01)
G06N 10/00     (2022.01)
G06F 1/12      (2006.01)

(52) U.S. Cl.
CPC ............ G06F 9/30058 (2013.01); G06F 1/12 (2013.01); G06N 10/00 (2019.01)

(58) Field of Classification Search
CPC ........ G06F 9/30058; G06F 1/12; G06N 10/00
See application file for complete search history.

(56) References Cited

U.S. PATENT DOCUMENTS

| 8,041,039 B2* | 10/2011 | Tajima | H04L 9/0855 |
| | | | 380/279 |
| 10,127,499 B1* | 11/2018 | Rigetti | G06N 10/00 |
| 10,505,524 B1* | 12/2019 | Cohen | G06N 10/00 |
| 2016/0267032 A1* | 9/2016 | Rigetti | G06F 13/4068 |

(Continued)

OTHER PUBLICATIONS

International Search Report and Written Opinion received for PCT Application Serial No. PCT/EP2022/064987 dated Sep. 28, 2022, 16 pages.

(Continued)

*Primary Examiner* — Zachary K Huson
(74) *Attorney, Agent, or Firm* — Amin, Turocy & Watson, LLP

(57) ABSTRACT

Embodiments are provided for centralized control of execution of a quantum program. In some embodiments, a system can include a processor that executes computer-executable components stored in memory. The computer-executable components include a synchronization component that causes multiple controller devices remotely located relative to the system to be synchronized with one another and the system. The computer-executable components also include an ingestion component that accesses measurement data resulting from one or more measurements at respective qubit devices. The computer-executable components further include a composition component that generates, using the measurement data, one or more control messages for respective second controller devices of the multiple controller devices.

25 Claims, 13 Drawing Sheets

(56) References Cited

U.S. PATENT DOCUMENTS

| | | |
|---|---|---|
| 2018/0260245 A1 | 9/2018 | Smith |
| 2020/0160204 A1 | 5/2020 | Johnson et al. |
| 2022/0150044 A1* | 5/2022 | Xiang .................... G06N 10/40 |

OTHER PUBLICATIONS

Sun et al., "Scalable Self-Adaptive Synchronous Triggering System in Superconducting Quantum Computing", IEEE Transactions on Nuclear Science, IEEE, USA, vol. 67, No. 9, Apr. 7, 2020, pp. 2148-2154.

Zettles et al., "26.2 Design Considerations for Superconducting Quantum Systems", 2022 IEEE International Solid-State Circuits Conference (ISSCC), vol. 65, Feb. 20, 2022, pp. 1-3.

Shi et al.,"Quantum Network Reduced-State Synchronization Part II—The Missing Symmetry and Switching Interactions," 2015 American Control Conference (ACC), Chicago, IL, USA, pp. 92-97.

Ryan et al., "Hardware for Dynamic Quantum Computing," arXiv:1704.08314v1 [quant-ph] Apr. 26, 2017, 13 pages.

Fu et al., "An Experimental Microarchitecture for a Superconducting Quantum Processor," arXiv:1708.07677v1 [quant-ph] Aug. 25, 2017, 13 pages.

Butko et al., "Understanding Quantum Control Processor Capabilities and Limitations through Circuit Characterization," arXiv:1909.11719v2 [quant-ph] Dec. 4, 2020, 10 pages.

Knill et al., "Optimal quantum measurements of expectation values of observables," Physical Review A 75, 012328 (2007), 13 pages.

Barrett et al., "Deterministic quantum teleportation of atomic qubits," Nature, vol. 429, pp. 737-739 (2004).

Mell et al., "The NIST Definition of Cloud Computing," Recommendations of the National Institute of Standards and Technology, NIST Special Publication 800-145, Sep. 2011, 7 pages.

"Quantum Computer Datasheet," https://quantumai.google/hardware/datasheet/weber.pdf, May 14, 2021, 6 pages.

\* cited by examiner

FIG. 5A  FIG. 5B

CENTRALIZED CONTROL OF EXECUTION OF QUANTUM PROGRAM

BACKGROUND

One or more embodiments of the disclosure relate to centralized control of execution of a quantum program.

Controlling program instructions executed on a quantum computer increases in complexity with the number of qubit devices that constitute a quantum processor of the quantum computer. Each qubit device may need to execute different waveforms in order to perform a desired quantum circuit. A common approach to control the execution of a quantum program is to have a centralized controller that issues instructions to per-qubit waveform units in order to dictate what quantum instruction to execute.

Commonplace centralized control approaches, however, have issues stemming from instruction issue rate and/or interconnect bandwidth. For instances, commonplace centralized controller architectures cannot efficiently distribute the diverse sets of program instructions to each qubit device in real time as the number of qubit devices in a quantum processor increases. Thus, scalability in such architecture may be difficult to achieve. Further, real time data is desirable, if not required, in order to allow complex quantum circuits to be executed.

Therefore, improved technologies for centralized control of execution of program instructions in a quantum computer may be desired.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later.

According to an embodiment, a system is provided. The system includes a processor that executes computer-executable components stored in memory. The computer-executable components include a synchronization component that causes multiple controller devices remotely located relative to the system to be synchronized with one another and the system. The computer-executable components also include an ingestion component that accesses measurement data resulting from one or more measurements at respective qubit devices. The computer-executable components further include a composition component that generates, using the measurement data, one or more control messages for respective second controller devices of the multiple controller devices. A first controller device of the respective second controller devices controls application of a signal to a first qubit device of the respective qubit devices. By the generating such a control message, the system has access to a small amount of information that can be supplied to the controller devices at runtime of a quantum program executed by qubit devices controlled by the controller devices. As a result, the execution of the quantum program can be controlled centrally and efficiently in real-time, which can permit readily increasing the the number of qubit devices that form the quantum processor.

In addition, or in other embodiments, the computer-executable components also can include a messaging component that sends a first message of the one or more control messages to the first controller device via a high speed, non-blocking, point-to-point connection. Further, or in yet other embodiments, the composition component generates a first message having at least one of first payload data defining an execution path for a branch instruction during execution of a quantum program at the first qubit device or second payload data defining operand data corresponding to one or more quantum operations within the execution path. Thus, such a first message can be supplied to a controller device at runtime of the quantum program. Because the first message includes payload data to select an appropriate branch pertaining to a branch instruction, in sharp contrast to commonplace approaches to centralized control, real-time centralized control of the execution of the quantum program can be efficiently accomplished by embodiments of this disclosure.

According to another embodiment, a computer-implemented method is provided. The computer-implemented method includes causing, by a system operatively coupled to a processor, multiple controller devices remotely located relative to the system to be synchronized with one another and the system. The computer-implemented method also includes accessing, by the system, measurement data resulting from one or more measurements at respective qubit devices. The computer-implemented method further includes generating, by the system, using the measurement data, one or more control messages for respective second controller devices of the multiple controller devices. A first controller device of the respective second controller devices controls application of a signal to a first qubit device of the respective qubit devices.

According to a further embodiment, a computer program product for control of execution of a quantum program. The computer program product includes a computer-readable storage medium having program instructions embodied therewith, the program instructions executable by a processor to cause the processor to cause multiple controller devices remotely located relative to the processor to be synchronized with one another and a computing system operatively coupled to the processor. The program instructions are also executable by the processor to cause the processor to access measurement data resulting from one or more measurements at respective qubit devices. The program instructions are also executable by the processor to cause the processor to generate, using the measurement data, one or more control messages for respective second controller devices of the multiple controller devices. A first controller device of the respective second controller devices controls application of a signal to first qubit device of the respective qubit devices.

According to an embodiment, a device is provided. The device includes a clock unit that receives a clocking signal from a computing system remotely located relative to the device, the clocking signal synchronizes the device with multiple second devices remotely located relative to the device. The device also includes a processor that executes computer-executable components stored in memory, where the computer-executable components include an ingestion component that receives data defining a quantum program from the computing system. The device controls application of a signal to a first qubit device of multiple qubit devices. The computer-executable components also include a control-flow handling component that identifies a measurement instruction of the quantum program during execution of the quantum program. The control-flow handling component also directs a monitoring component to causes measurement of at least one of a state of the first qubit device or a physical property of the first qubit device.

In addition, or in other embodiments, the computer-executable components also can include a reporting component that sends measurement data resulting from the measurement to the computing system via a high speed, non-blocking, point-to-point connection. Further, or in yet other embodiments, the ingestion component receives, from the computing system, a control message having at least one of first payload data defining an execution path responsive to the branch instruction or second payload data defining operand data corresponding to one or more quantum operations within the execution path. Such a control message can be received at runtime of a quantum program. Because the control first message includes payload data to select an appropriate brand pertaining to the branch instruction, in sharp contrast to commonplace approaches to centralized control, real-time centralized control of the execution of the quantum program can be efficiently accomplished by embodiments of this disclosure.

According to another embodiment, a computer-implemented method is provided. The computer-implemented method includes receiving, by a controller device having at least one processor, a clocking signal from a computing system remotely located relative to the controller device. The clocking signal synchronizes the device with multiple second devices remotely located relative to the device. The computer-implemented method also includes receiving, by the controller device, data defining a quantum program from the computing system. The controller device controls application of a signal to a first qubit device of multiple qubit devices that execute the quantum program. The computer-implemented method further includes identifying, by the controller device, a measurement instruction of the quantum program during execution of the quantum program. The computer-implemented method still further includes and causing, by the controller device, measurement of at least one of a state of the first qubit device or a physical property of the first qubit device.

DETAILED DESCRIPTION

Figure 1:
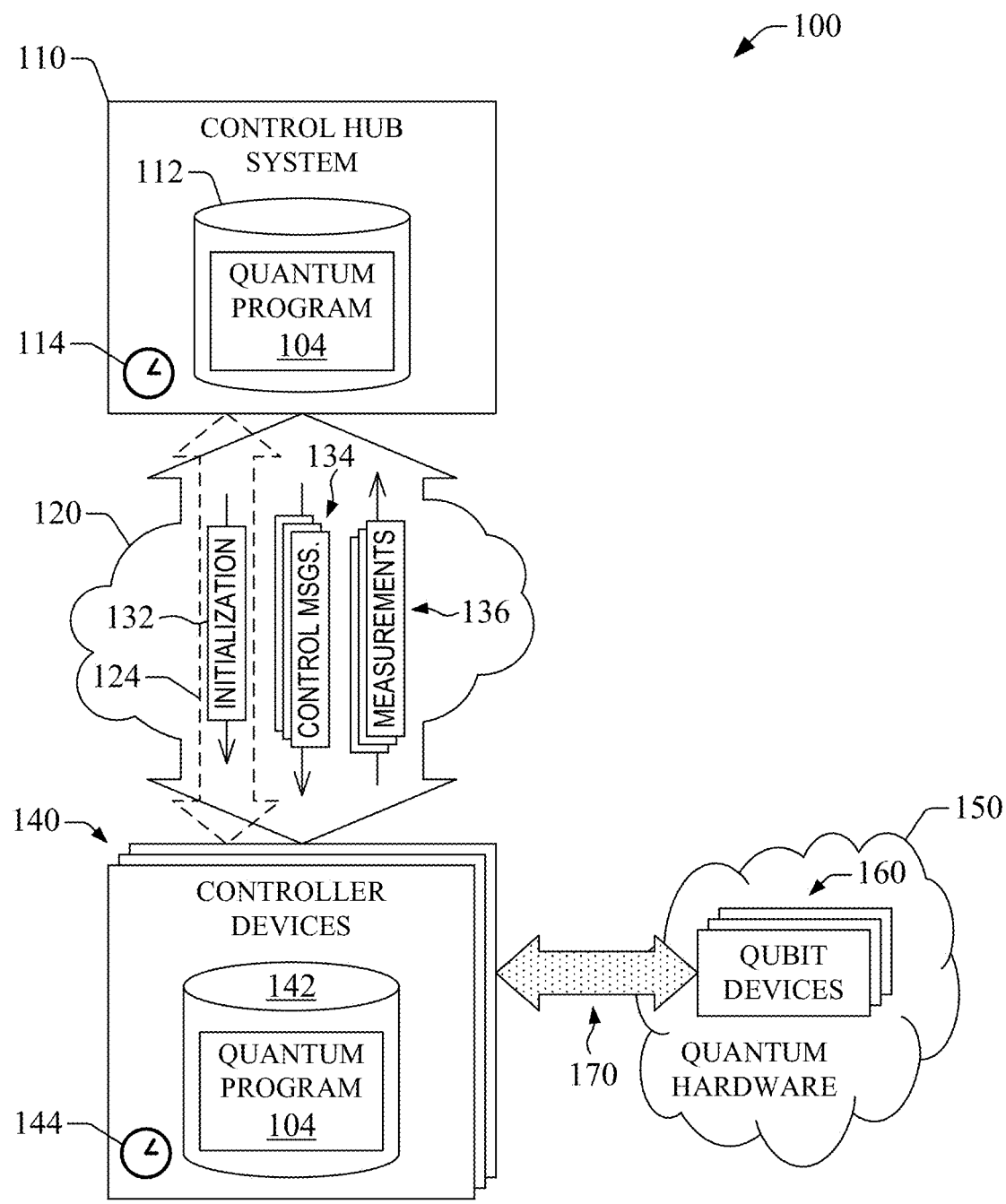
FIG. 1 illustrates a non-limiting example of an operational environment for centralized control of execution of a quantum program, in accordance with one or more embodiments of this disclosure.

Embodiments of the disclosure address the issue of centralized control of execution of quantum program in a quantum computer. To that end, embodiments of this disclosure can limit, in real time, the amount of data and number of messages carrying the data sent to a controller device associated with a qubit device included in a quantum processor of the quantum computer. More specifically, some embodiments of the disclosure can include a control hub system for classical control flow of program instructions that constitute the quantum program. Prior to execution of the quantum program in the quantum computer, the control hub system can send the quantum program to each one of multiple controller devices associated with multiple qubit devices that form the quantum processor. Accordingly, during execution of the quantum program, rather than sending a stream of data defining operations to be executed by the multiple qubit devices, the control hub system can send control messages having a small amount of payload data. In some cases, size of a control message can range from 16 bits to 64 bits. Each control message is formatted to have a header followed by a field that includes the payload data. The control messages can define control information to traverse a program control flow graph (CFG) corresponding to the quantum program. That is, the control information can permit selecting an execution path of a branch instruction and/or performing operations within the selected execution path. In addition, control messages can be sent at boundaries of the program CFG. As a result, the number of control messages that is transmitted is less than the number of messages transmitted in existing control platforms that send information (data or signaling) for every program instruction in the quantum program.

Different execution paths of the control path execution may have different numbers of program instruction and, therefore, different execution times. Because quantum instructions are generally non-commutative and also because some instructions may require tight timing alignment between transmit units and receive units, embodiments of the disclosure can permit maintaining the multiple control devices synchronized with one another. To that end, the control hub system can provide a synchronization mechanism that relies on a Future Action Time (FAT), where that mechanism can cause each one of the controller devices to pause until the controller devices have reached the same timeline point in the CFG before resuming execution.

Embodiments of the disclosure may provide several advantages relative to commonplace approaches to centralized control of execution of a quantum program. For example, by generating small control messages at runtime of a quantum program executed by qubit devices controlled by controller devices, embodiments of this disclosure have access to a small amount of appropriate information that can be supplied to the controller devices at runtime. Small control messages can permit making efficient use of network bandwidth, and also can reduce processing time at a device that receives such messages. As a result, the execution of the quantum program can be controlled centrally and efficiently in real-time, which can permit scaling to much larger quantum systems than have been possible to date. For instance, while existing quantum systems can scale up to about tens of qubits, embodiments of the disclosure can permit scaling a quantum system up to over ten thousand of qubits.

Further, not only can the control messages be generated at runtime, but they also can be supplied to a controller device at runtime. Accordingly, in sharp contrast to commonplace approaches to centralized control of execution of quantum programs, controller devices of this disclosure that receive such control messages can have access to payload data to select appropriate branches and perform operations within the branches. Hence, real-time centralized control of the execution of the quantum program can be efficiently accomplished by embodiments of this disclosure.

It is noted that some embodiments of this disclosure are described with reference to qubit devices and quantum circuits simply for the sake of illustration. The disclosure, however, is not limited in that respect. Indeed, the principles of this disclosure also can be applied to quantum programs that rely on other types of representation of quantum operations, and to any type of quantum devices (such as qudit devices or bosonic systems) utilized in a physical implementation of a quantum computer.

With reference to the drawings, FIG. 1 illustrates a non-limiting example of an operational environment 100 for centralized control of execution of a quantum program 104, in accordance with one or more embodiments of this disclosure. The quantum program 104 can define one or several algorithms. In some cases, the quantum program 104 can include one or several quantum circuits, where a quantum circuit can include multiple sequences of operations defining, at least partially, a quantum algorithm. In addition, or in other cases, the quantum program 104 can include one or several program schedules, where a program schedule can include multiple sequences of operations defining, at least partially, a quantum algorithm. In addition, a program schedule can define both instants and waveforms, where a particular waveform defined in the program schedule can be applied at a particular instant defined in the schedule. Without intending to be bound by theory or modeling, a sequence refers to an ordered list of quantum operations that occur one after another, on a channel input to the noisy quantum hardware. Thus, the quantum program 104 can include one or several sequences. A sequence represented as a program schedule can be configured to implement a circuit operation. Conversely, a circuit operation can have a program schedule definition in order to be operated on a quantum device.

Regardless its particular configuration, the quantum program 104 include program instructions that can be executed successively. The program instructions define quantum circuits or schedules, or both, and each program instruction that constitutes the quantum program 104 can be referred to as a quantum operation.

The operational environment 100 includes a control hub system 110 that can retain the quantum program 104 in one or more memory devices 112 (referred to as memory 112). The control hub system 110 can control the execution of the quantum program 104. To that end, the control hub system 110 is functionally coupled to multiple controller devices 140 remotely located relative to the control hub system 110. A communication network 120 can functionally couple the control hub system 110 and the multiple controller devices 140. The communication network 120 permits forming a high-speed (of the order of a Gbps, for example), non-blocking, point-to-point connections between the control hub system 110 and respective ones of the multiple controller devices 140. That is, the communication network 120 can functionally couple the control hub system 110 to a first one of the multiple controller devices 140 via a first high speed, non-blocking, point-to-point connection, and also can functionally couple the control hub system 110 to a second one of the multiple controller devices 140 via a second high speed, non-blocking, point-to-point connection. The disclosure, however, is not limited to a communication network 120 having a topology that provides point-to-point connections. Other network topologies can be contemplated. For example, in some embodiments, the communication network 120 can functionally couple the control hub system 110 and the controller devices 140 according to a ring network, a star network, or similar networks. Further, in some cases, scalability of the centralized control embodiments described herein may be improved when the communication network 120 lacks complete connectivity between control hub system 110 and a controller device of the controller devices 140 in a single hop. In an example embodiment, the communication network 120 can functionally couple the control hub system 110 and the controller devices 140 according to hypercube connectivity, where each one of the control hub system 110 and controller devices 140 is connected to a defined number of neighbors in a hypercube, and a control message can reach an intended controller device in a small number of hops across the hypercube.

The multiple controller devices 140 also are functionally coupled to multiple qubit devices 160 that constitute quantum hardware 150. The multiple quantum devices 160 can be arranged in a particular layout. Qubit devices included in the multiple qubit devices 160 can be solid-state devices of one of several types. Simply as an illustration, the qubit devices can be Josephson junction devices, semiconductor quantum-dots, or defects in a semiconductor material (such as vacancies in Si and Ge). In one example, each one of the qubit devices 160 can be embodied in a transmon. In other embodiments, the qubit devices can include atomic qubits assembled in an ion-trap. For instance, the atomic qubits can be embodied in a calcium ion, an ytterbium ion, or similar ions.

Multiple links 170 functionally couple the multiple controller devices 140 to the multiple qubit devices 160. The multiple links 170 can include solid-state links, such as microwave resonator devices or microwave transmission lines, or a combination of both, in some embodiments. At least some links of the multiple links 170 can permit sending signaling and/or data from a controller device to a qubit device. Such links or other links of the multiple can permit receiving signaling and/or data at a controller device from a qubit device. In some cases, at least some of the multiple links 170 can permit exchanging signaling and/or data between a controller device and a qubit device. In other words, the multiple links 170 can permit controller devices having different functionality, e.g., transmit-only, receive-only, and transmit-receive, to interact with quantum devices.

At least some of the multiple controller devices 140 can use the functional coupling provided by the multiple links 170 to control the application of signals to the multiple qubit devices 160. Such signals can correspond to quantum operations defined by program instructions of the quantum program 104. That is, at least some of the controller devices 140 can execute the quantum program 140. For instance, particular signals can correspond to a particular gate (or unitary) defined to act upon one or several particular qubit devices of the multiple qubit devices 160. In some embodiments, a first controller device of the multiple controller devices 140 can control the application of a signal to a first qubit device of the multiple qubit devices 160; a second controller device of the multiple controller devices 140 can control the application of a signal to a second qubit device of the multiple qubit device 160; and so forth.

Figure 2:
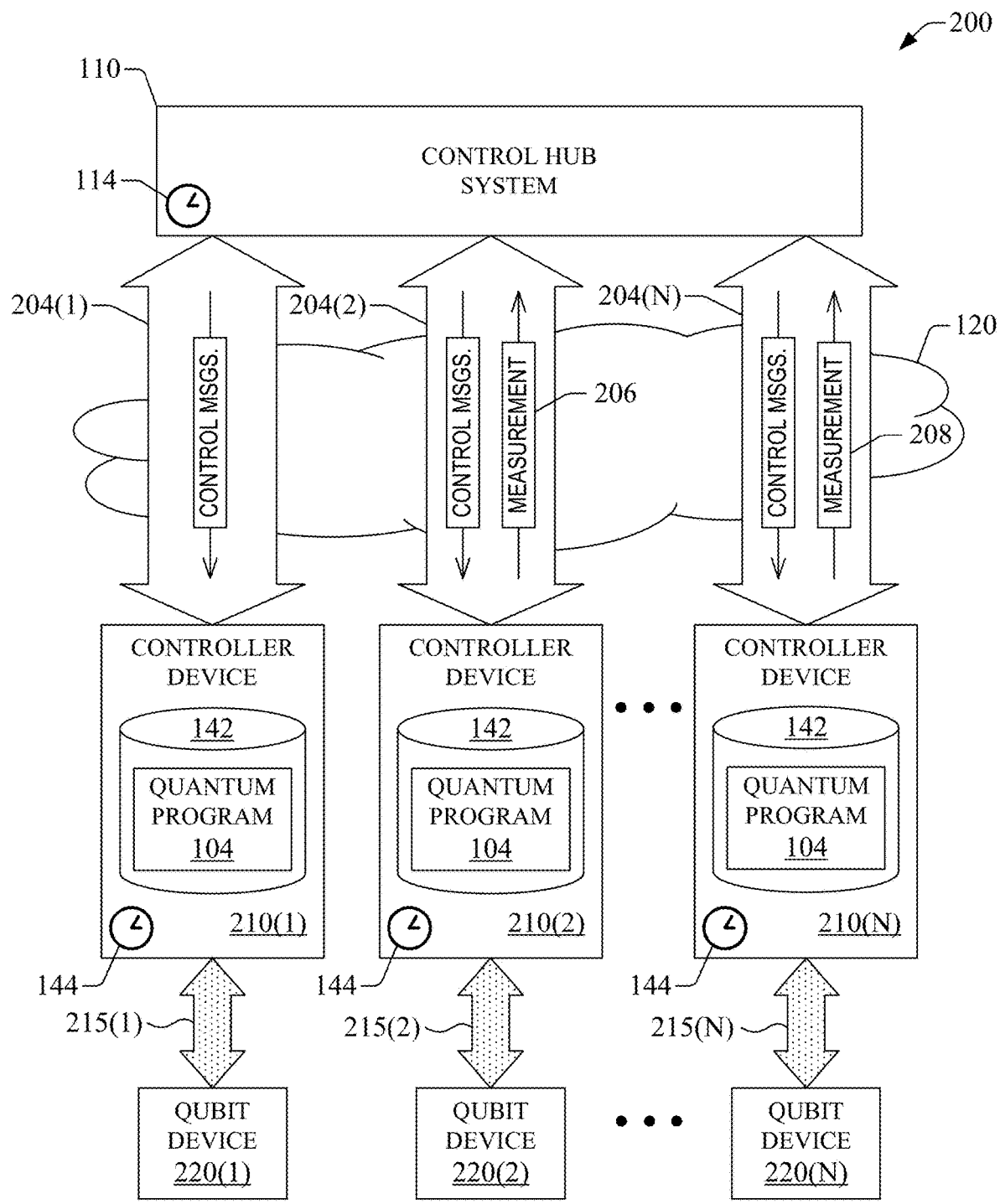
FIG. 2 illustrates a non-limiting example of a schematic arrangement of a control hub system, controller devices, and qubit devices included in the operational environment shown in FIG. 1, in accordance with one or more embodiments of this disclosure.

For purposes of illustration, FIG. 2 presents a schematic, non-limiting example arrangement 200 of the control hub system 110, the multiple controller devices 140, and the multiple qubit devices 160, in accordance with one or more embodiments of this disclosure. The arrangement 200 illustrates functional coupling between the control hub system 110 and the multiple controller devices 140, and the multiple controller devices 140 and the qubit devices 160. The multiple controller devices 140 can include, for example, a first controller device 210(1), a second controller device 210(2), and other controller devices up to an N-th controller device 210(N). Here, N is a natural number greater than unity. The control hub system 110 can be functionally coupled to a controller devices 210(K) via a high-speed, non-blocking, point-to-point connection 204(K), with K=1, 2, . . . , N. Specifically, the control hub system 110 can be functionally coupled to the controller devices 210(1) via a first high-speed, non-blocking, point-to-point connection 204(1); the control hub system 110 also can be functionally coupled to the controller device 210(2) via a second high-speed, non-blocking, point-to-point connection 204(2); . . . ; and the control hub system 110 can further be functionally coupled to the controller device 210(N) via a high-speed, non-blocking, point-to-point connection 204(N). The high-speed, non-blocking, point-to-point connection 204(K) embodies a hub-controller message pathway.

As is illustrated in FIG. 2, the multiple qubit devices 160 can include, for example, a first qubit device 220(1), a second qubit device 220(2), and other qubit devices up to an N-th qubit device 220(N). In the example arrangement 200, each control device 210(K) is functionally coupled to a qubit device 220(K) by a bidirectional link 215(K) (a link that can supply information upstream and downstream). It is noted that embodiments of this disclosure are not limited to such a one-to-one coupling and/or bidirectional links 215(1) to 215(N). In some embodiments, two or more qubit devices of the qubit devices 160 can be functionally coupled to a single controller device of the multiple controller devices 140. In yet other embodiments, combinations of different types of functional couplings can be implemented, where some of the controller devices 140 and some of the qubit devices 160 can be arranged in a one-to-one configuration, and some other ones of the controller devices 140 and some other ones of the qubit devices 160 can be arranged in one-to-many configurations. In still other embodiments, a group of several controller devices of the multiple controller devices 140 can be functionally coupled to a single qubit device of the qubit devices 160. By having several controller devices coupled to a single qubit device, stimuli of different characteristics can be applied to that single qubit device, for example. Such stimuli can include AC-coupled RF pulses and DC-coupled flux pulses, in some cases.

The high-speed, non-blocking, point-to-point connections provided by the communication network 120 can be used to send messages from the control hub system 110 to the multiple controller devices 140 as part of the centralized control of execution of the quantum program 104. As is illustrated in FIG. 1, the messages can include initialization messages 132 and control messages 134.

The control hub system 110 can send initialization messages 132 to configure the controller devices 140 in an initial control state prior to execution of the quantum program 104. In that state, each one of the multiple controller devices 140 can retain a copy of the quantum program 104 within one or more memory devices 142. In addition, respective clock units 144 of the multiple controller devices 140 can be synchronized with one another and with a clock unit 114 of the control hub system 110. Accordingly, the control hub system 110 can send first initialization messages 132 carrying payload data defining the quantum program 104 to respective ones of the multiple controller devices 140.

Figure 3:
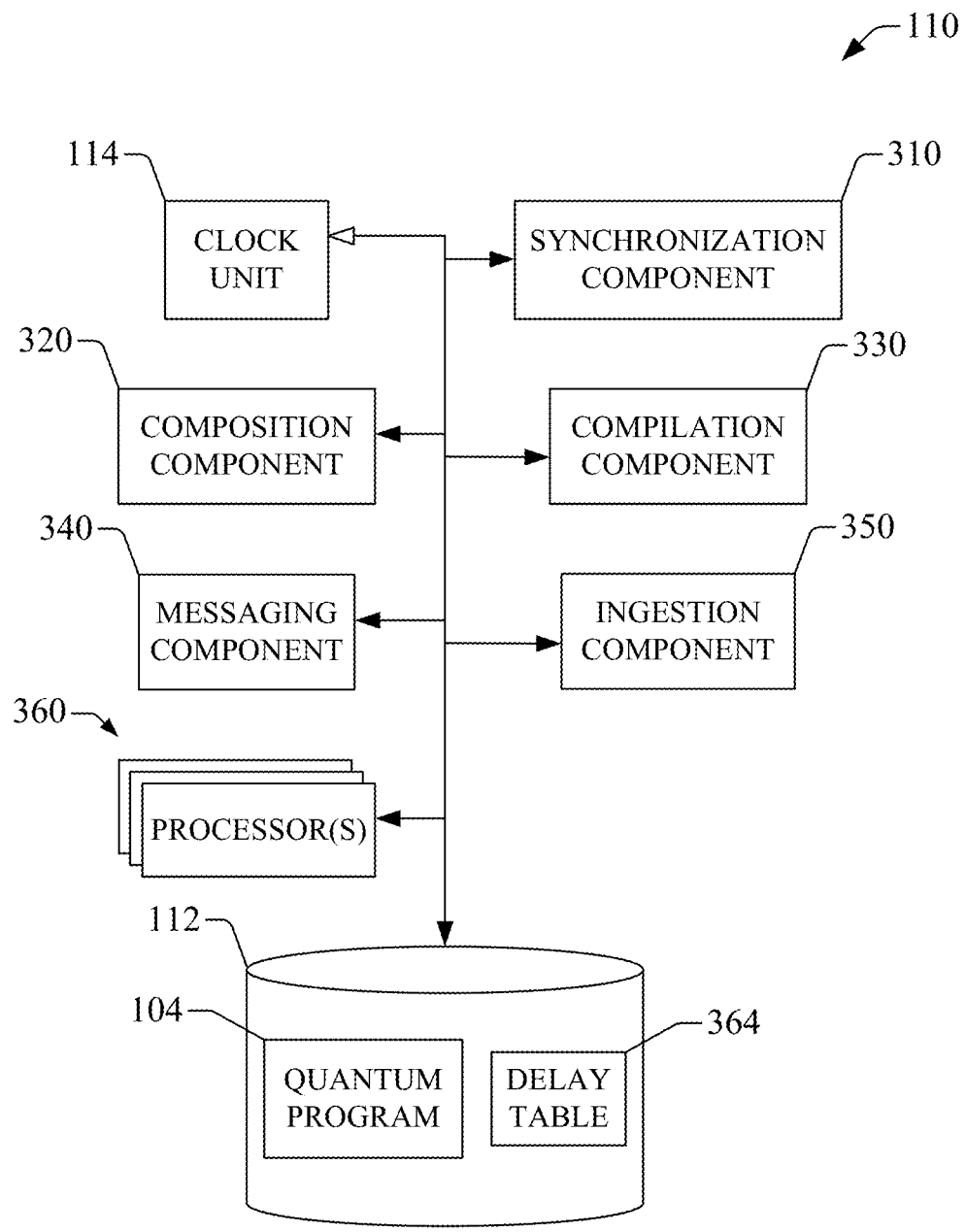
FIG. 3 illustrates a non-limiting example of a control hub system for centralized control of execution of a quantum program, in accordance with one or more embodiments of this disclosure.
Figure 4:
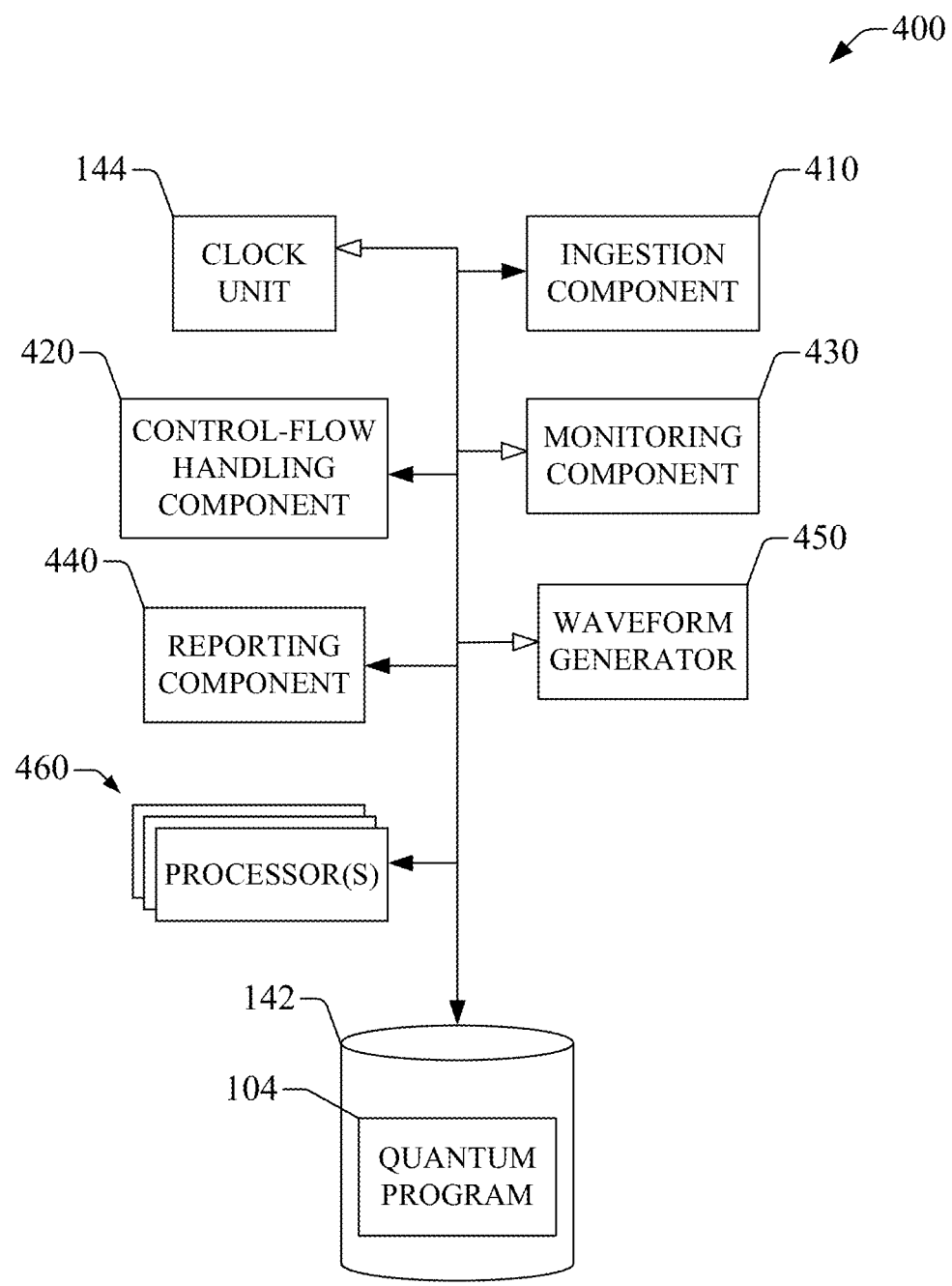
FIG. 4 illustrates a non-limiting example of a control device for centralized control of execution of a quantum program, in accordance with one or more embodiments of this disclosure.

The first initialization messages 132 can be sent via respective high speed, non-blocking, point-to-point connections, as is described herein. In some cases, rather than sending the first initialization messages 132 over respective hub-controller message pathways, the control hub system 110 can optionally send the first initialization messages 132 to the multiple controller devices 140 via a separate higher bandwidth interface 124 (such as an Ethernet interface). Regardless of the type of connectivity relied upon to send the first initialization messages 132, in some embodiments, as is shown in FIG. 3, the control hub system 110 can include a compilation component 330 that can send the first initialization messages 132 to respective ones of the controller devices 140. As is also illustrated in FIG. 3, the control hub system 110 also can include other components, one or several processors 360, and the memory 112. The components, the processor(s) 360, and the memory 112 can be electrically, optically and/or communicatively coupled to one another. In addition, or in further embodiments, as is shown in FIG. 4, at least one of the controller devices 140 can include an ingestion component 410 that can receive the data defining the quantum program 104. As is also illustrated in FIG. 4, the controller device 400 representing one or more of the controller devices 140 also can include other components, one or several processors 460, and the memory 142. The components, the processor(s) 460, and the memory 142 can be electrically, optically and/or communicatively coupled to one another.

The control hub system 110 also can send second initialization messages 132 to respective ones of the multiple controller device 140 in order to synchronize respective clock units 144. Each one of the second initialization messages 132 can direct a respective controller device 140 to start a clock unit 144 integrated therein (or, in some cases, functionally coupled thereto). The control hub system 110 can send the second initialization messages 132 upon starting the clock unit 114 of the control hub system 110. Hence, the control hub system 110 and the multiple controller devices 140 can be synchronized with one another.

To synchronize those clock units, in some embodiments, the control hub system 110 can include a synchronization component 310 (FIG. 3) that can cause the multiple controller devices 140 to be synchronized with one another and the control hub system 110. To that point, the synchronization component 310 can start the clock unit 112 and can direct the multiple controller devices 140 to start respective clock units 144. In some embodiments, the clock unit 112 can be connected to each clock unit 144 by appropriate wireline links and an adapter interfaces integrated into respective ones of the controller devices 140. In response to the synchronization component 310 starting the clock unit 112, each clock unit 144 can receive a clocking signal that triggers the clock unit 144 and embodies a timing signal for each one of the controller devices 140.

The control messages 134 can direct execution flow of the quantum program 104. In one aspect, the control hub system 110 can generate an initial control message of the control messages 134. The initial control message can direct the controller devices 140 to initiate execution of the quantum program 104 at the multiple qubit devices 160. Thus, the initial control message can include an instruction to that effect. In some cases, because respective clock units 144 of the multiple controller devices 140 have been synchronized, the initial control message also can include payload data defining a particular time (such as a defined delay Δt) to initiate execution of the quantum program. The control hub system 110 can then send the initial control message to the controller devices 140. In some embodiments, as is illustrated in FIG. 3, the control hub system 110 can include a composition component 320 that can generate the initial control message to initiate the execution of the quantum program at the multiple qubit devices 160. In addition, the control hub system 110 also can include a messaging component 340 that can send the initial control message to the multiple controller devices 140. Specifically, the messaging component 340 can send the initial control message to a first one of the multiple controller devices 140 via a high speed, non-blocking, point-to-point connection, and also can send the initial control message to a second one of the multiple controller devices 140 via another high speed, non-blocking, point-to-point connection.

In response to receiving the initial control message, each one of the controller devices 140 that has received the initial control message can initiate execution of the quantum program 104. To that end, in some embodiments, as shown in FIG. 4, each one of those controller devices can include one or more processors 460 that can cause a waveform generator 450 to apply one or several waveforms to a qubit device, where the applied waveform(s) are dictated by a quantum circuit within the quantum program. The waveform generator 450 can be embodied, for example, in an arbitrary waveform generator (AWG) that outputs voltage signal according to a defined waveform.

The quantum program 104 has a defined control flow structure and, because each controller device executes the same quantum program 104, each controller device can follow a same path through a global program CFG. In some cases, the quantum program 104 includes multiple branch instructions, where at least one of the branch instructions can have conditional execution paths (or branches). Whether a particular conditional execution path is taken, e.g., instructions in that branch are executed, can depend on runtime values. The runtime values can be generated, for example, via qubit measurements or runtime classical computations, or a combination of both. A qubit measurement can be initially localized to a particular controller device. Upon completing the measurement, or after the measurement is completed, the particular controller device can send measurement data resulting from the qubit measurement to the control hub system 110. A measurement instruction included in the quantum program 104 can cause one or several qubit measurements. The quantum program can include multiple measurement instructions.

In some embodiments, as is shown in FIG. 4, at least one of the controller devices 140 can include a monitoring component 430 that can cause measurement of a state of a qubit device functionally coupled to the monitoring component 430. Such a measurement can probe one or more observables of the qubit device. In addition to, or as an alternative, the monitoring component 430 can cause measurement of temperature. An observed temperature can cause a controller device to throttle the execution of new program instructions in the quantum program 104 when one or more chipsets in a cryostat that includes the qubit devices 160 are operating at a temperature that can stress the cooling capacity of the cryostat. Besides temperature, in some cases, the monitoring component 430 also can cause measurement of other physical properties of a qubit device or an operating environment thereof. In one example embodiment, the monitoring component 430 can probe voltage rails and/or current. Measurement data resulting from probing voltage rails can be used to maintain flux control pulses within specification). Measurement data resulting from probing current can be used to control heating and cooling, and also, perhaps, for throttling a high bandwidth path into cryostat chipse(s) to loading tests and/or unload test case data. In addition, or in another example embodiment, the monitoring component 430 can detect a transition of a quantum system out of the 0-1 qubit manifold. Further, or in yet another example embodiment, the monitoring component 430 can detect loss of a qubit (such as an ultracold atom in an optical lattice). To that point, in such an embodiment, the monitoring component 430 can include a charge-coupled device (CCD) camera. In addition, at least one of the controller devices 140 can include a reporting component 440 that can send measurement data resulting from the measurement to the control hub system 110. As is shown in FIG. 3, in some embodiments, an ingestion component 350 can receive the measurement data.

More specifically, a controller device of the controller devices 140 can identify a measurement instruction of the quantum program 104 at runtime. The measurement instruction can be identified by resolving an instruction of the quantum program 104 within an execution thread of the quantum program 104. To that end, in some embodiments, at least one of the controller devices 140 can include a control-flow handling component 420 (FIG. 4) that resolves an instruction and determines that the instruction is a measurement instruction.

In response to identifying a measurement instructions, the controller device can cause measurement of a state of the qubit device controlled by the controller device. To that end, in some embodiments, the control-flow handling component 420 can direct the monitoring component 430 to measure a state of a qubit device and/or other physical properties of the qubit device of an environment thereof. The control-flow handling component 420 can send signaling identifying the type of measurement(s) to be performed to the monitoring component 430. The controller device can then send measurement data resulting from the measurement to the control hub system 110. As an illustration, with reference to FIG. 2, the controller device can be embodied in the controller device 210(2). The controller device 210(2) can determine, during execution of the quantum program 104, that an instruction fetched for execution is a measurement instruction. In response to such a determination, the controller device 210(2) can cause measurement of the state of the qubit device 220(2). The controller device 210(2) can send measurement data 206 resulting from the measurement to the control hub system 110. In some cases, a second controller device also can cause measurement of a state of another qubit device. For instance, in addition to the controller device 210(2), the controller device 210(N) can cause a measurement of the qubit device 220(N) in response to determining that an instruction fetched for execution is a measurement instruction. The controller device 210(N) can then send measurement data 208 resulting from the measurement to the control hub system 110.

With further reference to FIG. 1, the control hub system 110, using classical computing techniques, can generate new runtime values using measurement data 136 received from a controller device of the controller devices 140 in response to a measurement instruction. In some cases, a runtime value generated using the measurement data defines an execution path for a branch instruction. The control hub system 110 can generate a control message having payload data defining that execution path. The control hub system 110 also can send the control message, as one of the control messages 134, for example, to each one of the controller devices 140. As mentioned, the control message can be sent to controller device 140 via respective high speed, non-blocking, point-to-point connections. In some embodiments, the composition component 320 (FIG. 3) can generate such a control message and the messaging component 340 (FIG. 3) can send the control message to the control device that supplied the measurement data.

Passing such a control message to each one of the controller devices 140 can permit the controller devices 140 to determine which conditional execution pathway of a branch instruction is to be taken at runtime. Because the instruction stream, including all possible branch instructions, has been loaded to the controller devices 140 prior to execution, there is no need to send a long list of program instructions to execute. Such a long list can include thousands of program instructions and, in some cases, even millions of instructions. What is sent is a small control message containing information for selecting an execution path in response to the branch instruction. Accordingly, usage of network bandwidth and processor cycles can be reduced relative to existing approaches to centralized control of execution of quantum programs.

Data that permits determining an execution path in response to a branch instruction can be referred to branch-selection data. Branch selection data for the branch instruction can be received prior to execution of the branch instructions. In those cases, controller devices that receive the branch-selection data in respective control messages (e.g., received in at least some of the control messages 134) can retain the received branch-selection data in memory 142. In other cases, because the control hub system 110 is synchronized with the multiple controller devices 140 and can access the sequence of program instructions in the quantum program 104, the control hub system 110 can send a control message including branch-selection data in response to fetching a branch instruction. As such, a controller device of the controller devices 140 can receive a control message containing branch-selection data in response to identify a branch instruction of the quantum program 104 at runtime. The controller device can identify the branch instruction by resolving an instruction of the quantum program 104 within an execution thread of the quantum program 104. To that end, in some embodiments, the control-flow handling component 420 (FIG. 4) can resolve a fetched instruction and can determine that the instruction is a branch instruction.

Simply as an illustration, FIG. 5A presents a schematic, non-limiting example of a sequence of program instructions, represented by a program control flow graph (CFG) 500, that can be loaded on each one of the controller devices 140 (FIG. 1), in accordance with one or more embodiments of the disclosure. The program CFG 500 includes multiple nodes, each represented by a circle labeled with a number. Each node 510(J), with J=1, 2, 3, 4, 5, 6, 7, represents a section of a quantum circuit without control flow, except, perhaps, for a terminal branch instruction without associated branches. The section can thus be represented as a straight-line sub-CFG. Each one of the controller devices 140 can execute, in succession, a first quantum circuit represented by node 510(1) and a second quantum circuit represented by node 510(2). After executing the node 510(2), a branch instruction in the sequence of program instructions can use branch-selection data within a control message from the control hub system 110 or, in some cases, the memory 142 of the controller device in order to determine if node 510(3) or node 510(4) is executed next. Thus, based on branch-selection data at node 510(2), one program execution can take the execution path that includes node 510(3) and node 510(4), and another program execution can take the execution path that includes node 510(4).

In order for execution of the quantum program 104 to remain synchronized across the multiple controller devices 140, it is necessary that after completing execution of the taken execution path, each one of the multiple controller devices 140 continue execution of an applicable node (e.g., node 510(6)) synchronously, even if control messages from the control hub system 110 containing branch-selection data arrive at the controller devices 140 at different times. To that point, to preserve synchronization in the execution of the quantum program 104, embodiments of this disclosure rely on a Future Action Time $t_{FAT}$. Without intending to be bound by modeling, the control hub system 110 can determine $t_{FAT}$ using a worst-case propagation delay $\delta\tau$ through the communications network 120 that functionally couples the control hub system 110 and the controller devices 140.

Specifically, $t_{FAT}$ can be equal to current time t plus &r. Because respective clock units 144 of the controller devices 140 have been synchronized, the current time t is the same in each one of the controller devices 140. In some embodiments, the control hub system 110 can determine $t_{FAT}$ via the compilation component 330 (FIG. 3). To that end, the compilation component 310 can access propagation delay data identifying various propagation delays for communications between the control hub system 110 and the controller devices 140. The propagation delay data can be retained in a delay table 364, for example. The propagation delay data can be generated prior to execution of the quantum program 104. For instance, the control hub system 110, via the synchronization component 310, for example, can generate the propagation delay data by sending pilot message to each one of the controller devices 140 after synchronization of those devices with one another and the control hub system 110. The control hub system 110, via the synchronization component, for example can monitor delay in receipt of a response to those pilot messages from the controller devices, and can record delay data in the delay table 364. In addition to determining $t_{FAT}$, the control hub system 110 can add payload data indicative of $t_{FAT}$, to a control message that includes branch-selection data.

Accordingly, continuing with reference to the example program CFG 500, after node 510(2) is executed, the control hub system 110 can insert a delay instruction into the instruction stream corresponding to the quantum program 104 in order to pause execution at each one of the controller devices 140 until a respective local clock unit matches $t_{FAT}$. The delay instruction can be generically represented by 'WAIT until current time=FAT'. Because the quantum program 104 is executed sequentially in each one of the controller devices 140, the control hub system 110 can insert the delay instruction by sending a control message (e.g., one of control messages 134) including payload data defining the delay instruction. Delaying further execution until the FAT can guarantee that each controller device can proceed synchronously.

Using a FAT can provide additional efficiencies when execution paths through a program CFG have different execution durations, allowing for resynchronization when program CFG paths rejoin. For example, in FIG. 5A, one program execution can follow the path 1-2-3-5-6-7 while another program execution can follow 1-2-4-6-7, depending on the conditional information (e.g., measurement data) received at node 510(2). In case where the execution time of respective quantum circuits for node 510(3) and node 510(5) is different than the execution time for quantum circuit corresponding to node 510(4), execution of the quantum program 104 can arrive at node 510(6) at different times. For instance, in the case where each node in a branch has equal execution time, the conditional execution path that includes node 510(4) (denoted as R branch in FIG. 5A) can be executed faster than the other conditional execution path that includes node 510(3) and node 510(5) (denoted as L branch in FIG. 5A). Further, it is possible that one or several of the controller devices 140 take no local action(s) for either branch. Such control device can be referred to as spectator controller. In situations where one or more several spectator controllers are present for some section of the CFG 500 with a branch and merge—as is shown in FIG. 5A where the conditional execution paths merge at node 510(6)—node 510(3), node 510(4), and node 510(5) can be removed from the quantum program 104 loaded on those spectator controller(s) and can be replaced with a synchronization instruction 550 immediately prior to node 510(6), as is shown in FIG. 5B.

Besides generating runtime values that define a branch to be taken, in some cases, the control hub system 110 can classically compute other runtime values that can be used as operands or other type of instruction data during execution of the quantum program 104. Such runtime values also can be generated in response to measurement received from one or more controller devices (e.g., controller device 210(2) and/or controller device 210(N)). The control hub system 110 can generate control messages that include payload data defining an operand or containing another type of instruction data. That type of control messages can be included in the control messages 132, and can be referred to as "instruction-data messages."

Instruction-data messages can be used in many scenarios. In one example scenario, quantum circuits depend upon data that is constructed at runtime. An example can be an iterative phase estimation quantum circuit where each iteration contains a rotation $R_Z(\theta)$, the rotation angle $\theta$ being determined at runtime by qubit measurements in previous iterations. In such a case, that section of the quantum circuit may be expressed with an instruction with an operand that references data that can be received from the control hub system 110.

Figure 5:
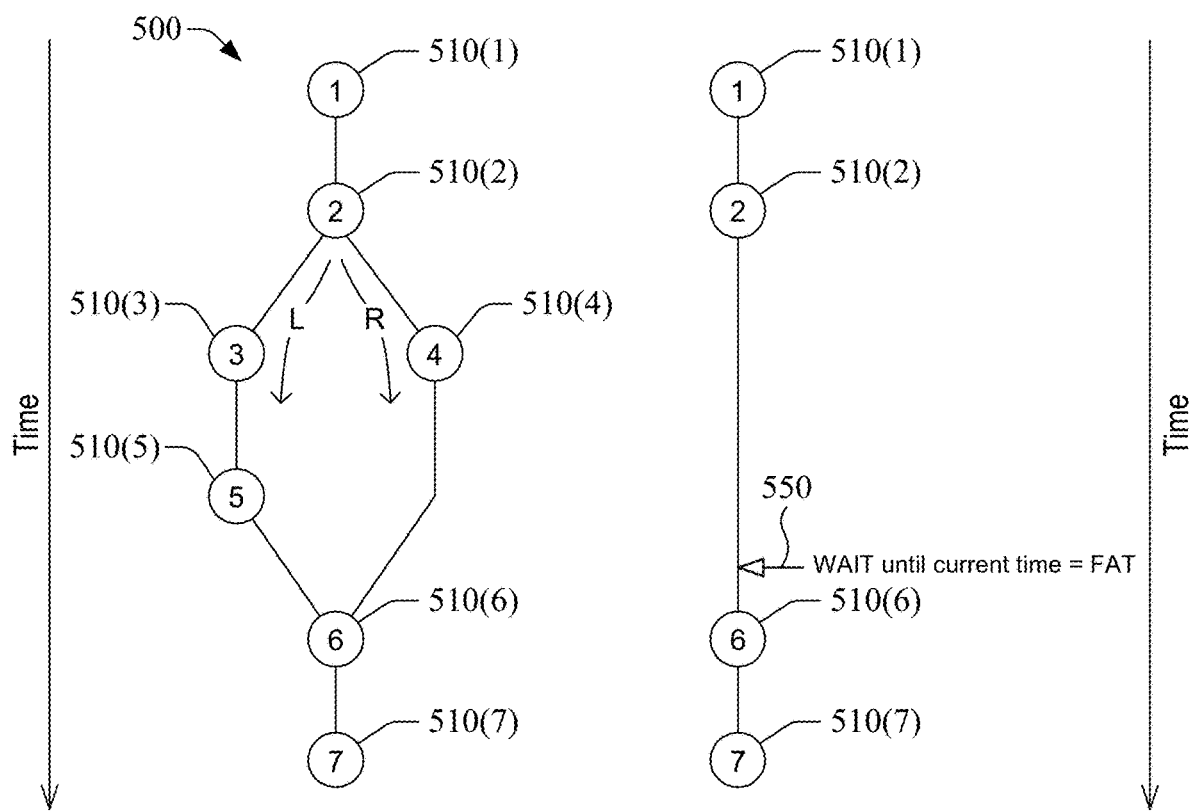
FIG. 5A illustrates a schematic, non-limiting example of a sequence of program instructions, represented by a program control flow graph (CFG), that can be loaded on a controller device, in accordance with one or more embodiments of the disclosure.
FIG. 5B illustrates another schematic, non-limiting example of a sequence of program instructions, also represented by a program CFG, that can be loaded on a controller device, in accordance with one or more embodiments of the disclosure.
Figure 6:
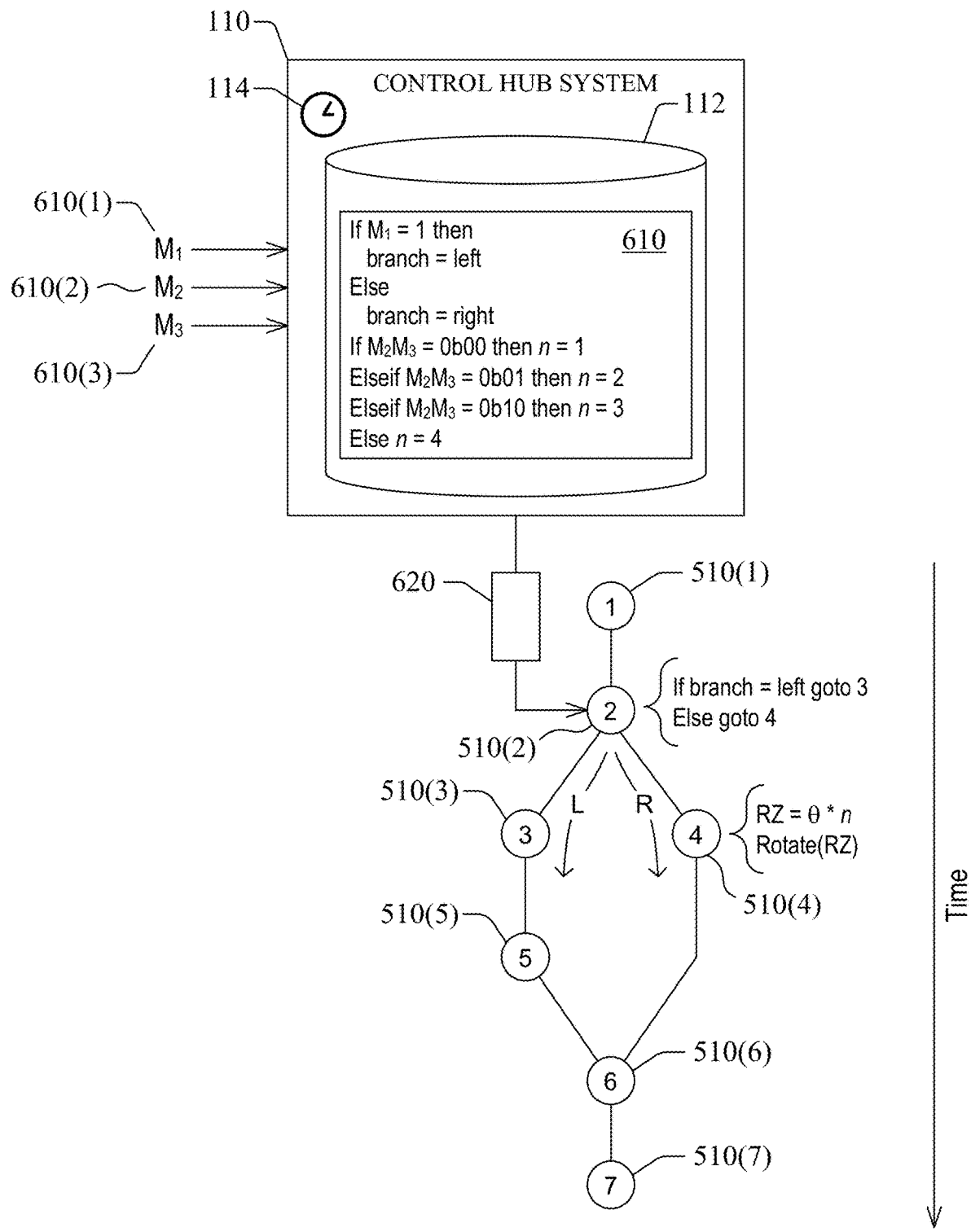
FIG. 6 presents a non-limiting example of the program CFG shown in FIG. 5A, where a node in that program CFG defines an operation that includes an operand based on a result of measurements at quantum hardware, in accordance with one or more embodiments of the disclosure.

As an illustration of the use of instruction-data messages in the foregoing example scenario, FIG. 6 presents a non-limiting example of the program CFG 500 shown in FIG. 5, where the node 510(4) defines an operation that includes an operand based on a result of qubit measurements. The operation is rotation Rz by a defined amount $\theta \cdot n$, where $\theta$ represents an angle and the factor n is defined by measurement data.

As is shown in FIG. 6, the control hub system 110 can receive measurement data resulting from qubit measurements. The measurement data can include first measurement data 610(1), second measurement data 610(2), and third measurement data 610(3). Such first data, second data, and third data are represented, respectively, by $M_1$, $M_2$ and $M_3$, and can be indicative of respective states of a first qubit device, a second qubit device, and a third qubit device. Accordingly, $M_1$ can be equal to "0" or "1," $M_2$ also can be equal to "0" or "1," and $M_3$ also can be equal to "0" or "1." As mentioned, the control hub system 110 can receive the measurement data from one or more controller devices of the control devices 140. As also mentioned, in some embodiments, the control hub system 110 can receive the measurement data via the ingestion component 350.

As part of execution of the quantum program 104, the control hub system 110 can use at least one of $M_1$, $M_2$, or $M_3$ to generate a control flow outcome. In the example shown in FIG. 6, in the example program instructions 610, if $M_1$ has a value of zero, then the rotation Rz should be performed (branch right). When the rotation is to be performed, the respective values of $M_2$ and $M_3$ can determine the amount of rotation by determining the factor n. To that end, in the example program instructions 610, $M_2$ and $M_3$ define a two-bit binary field represented by $M_2M_3$. The amount of the rotation can thus be determined by four values: 0b00, 0b01, 0b10, and 0b11, as is conveyed in FIG. 6. A variable, represented by "branch," can have one of two values (L or R, for example), each one of those values identifying an execution path to be taken in response to the value of $M_1$. The control hub system 110 can generate an instruction-data message 620 that can include payload data defining the "branch" variable. That is, the payload data can configure the branch variable to one of "L" or "R," for example. The instruction-data message 620 also can include second payload data that defines an operand identifying the factor n, which factor define the amount of rotation $\theta \cdot n$. The control hub system 110 can then send the instruction-data message 620 to the controller devices 140. At node 2 in program CFG 500 uses the "branch" variable information to determine if execution path L or execution path R is to be executed next. Accordingly, when the instruction-data message 620 conveys that the branch variable is equal to R, the controller device executing node 2 can determine that the execution path R, including node 4, is to be taken and executed next. At node 4, the controller device can then use the second payload data defining the operand to determine the degree of rotation Rz to perform.

Figure 7:
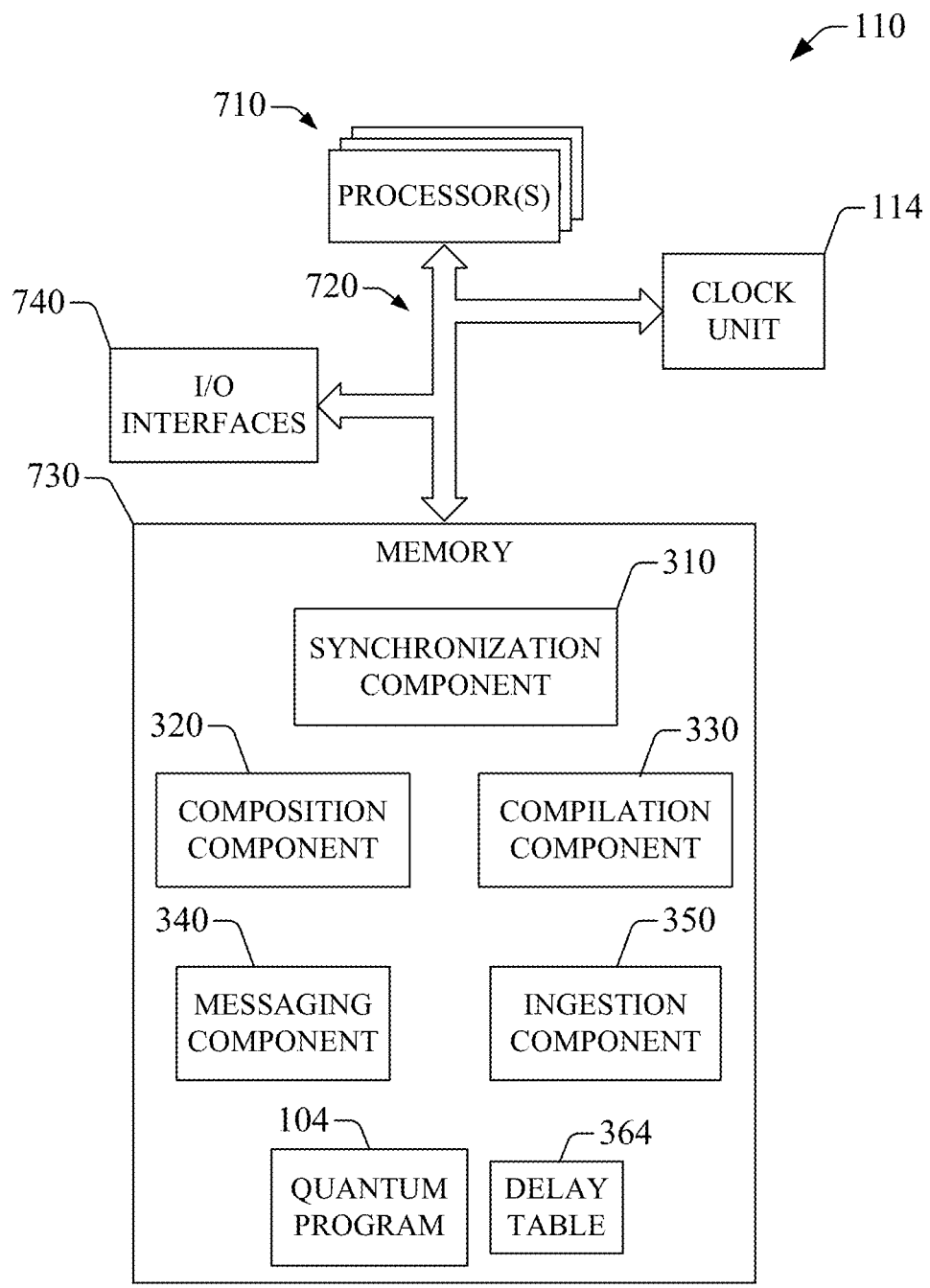
FIG. 7 illustrates a non-limiting example of a computing system for centralized control of execution of a quantum program, in accordance with one or more embodiments described herein.

FIG. 7 is a block diagram of a non-limiting example of the control hub system 110 for centralized control of execution of a quantum program, in accordance with one or more embodiments described herein. As is illustrated in FIG. 7, the control hub system 120 can include one or several processors 710, one or several memory devices 730 (referred to as memory 730), and the clock unit 114. In some embodiments, the processor(s) 710 can be arranged in a single computing apparatus (a blade server device or another type of server device, for example). In other embodiments, the processor(s) 710 can be distributed across two or more computing apparatuses (e.g., multiple blade server devices or other types of server devices).

The processor(s) 710 can be operatively coupled to the memory 730, the clock unit 114, and the I/O interfaces 740 via one or several communication interfaces 720, for example. The communication interface(s) 720 can be suitable for the particular arrangement (localized or distributed) of the processor(s) 710. In some embodiments, the communication interface(s) 720 can include one or many bus architectures, such an Ethernet-based industrial bus, a controller area network (CAN) bus, a Modbus, other types of fieldbus architectures, or the like. In addition, or in other embodiments, the communication interface(s) can include a wireless network and/or a wireline network having respective footprints. The I/O interfaces 840, individually or in a particular combination, permit sending data/signaling from and/or receiving data/signaling at the control hub system 110. The I/O interfaces 840 can include serial ports, parallel ports, general-purposed I/O (GPIO) pins, or a combination of those.

The memory 730 can retain or otherwise store therein machine-accessible components (e.g., computer-readable and/or computer-executable components) and data in accordance with this disclosure. As such, in some embodiments, machine-accessible instructions (e.g., computer-readable and/or computer-executable instructions) embody or otherwise constitute each one of the machine-accessible components within the memory 730. The machine-accessible instructions can be encoded in the memory 730 and can be arranged to form each one of the machine-accessible components. The machine-accessible instructions can be built (e.g., linked and compiled) and retained in computer-executable form within the memory 730 or in one or several other machine-accessible non-transitory storage media. Specifically, as is shown in FIG. 7, in some embodiments, the machine-accessible components include the synchronization component 310, the composition component 320, the compilation component 330, the messaging component 340, and the ingestion component 350. The memory 730 also can include data that permits various of the functionalities described herein. For example, as is illustrated in FIG. 7, the memory 830 can retain the quantum program 104.

The machine-accessible components, individually or in a particular combination, can be accessed and executed by at least one of the processor(s) 710. In response to execution, each one of the machine-accessible components can provide the functionality described herein in connection with centralized control of execution of a quantum program. Accordingly, execution of the computer-accessible components retained in the memory 730 can cause the control hub system 110 to operate in accordance with aspects described herein. More concretely, as an example, at least one of the processor(s) 710 can execute the machine-accessible components to cause the control hub system 110 to perform one or a combination of techniques in accordance with aspects described herein.

Although not illustrated in FIG. 7, the control hub system 120 also can include other types of computing resources that can permit or otherwise facilitate the execution of the machine-accessible components retained in the memory 730. Those computing resources can include, for example, central processing units (CPUs), graphics processing units (GPUs), tensor processing units (TPUs), memory, disk space, incoming bandwidth, and/or outgoing bandwidth, interface(s) (such as I/O interfaces); controller devices(s); power supplies; and the like. For instance, the memory 730 also can include programming interface(s) (such as APIs); an operating system; software for configuration and or control of a virtualized environment; firmware; and similar.

Figure 8:
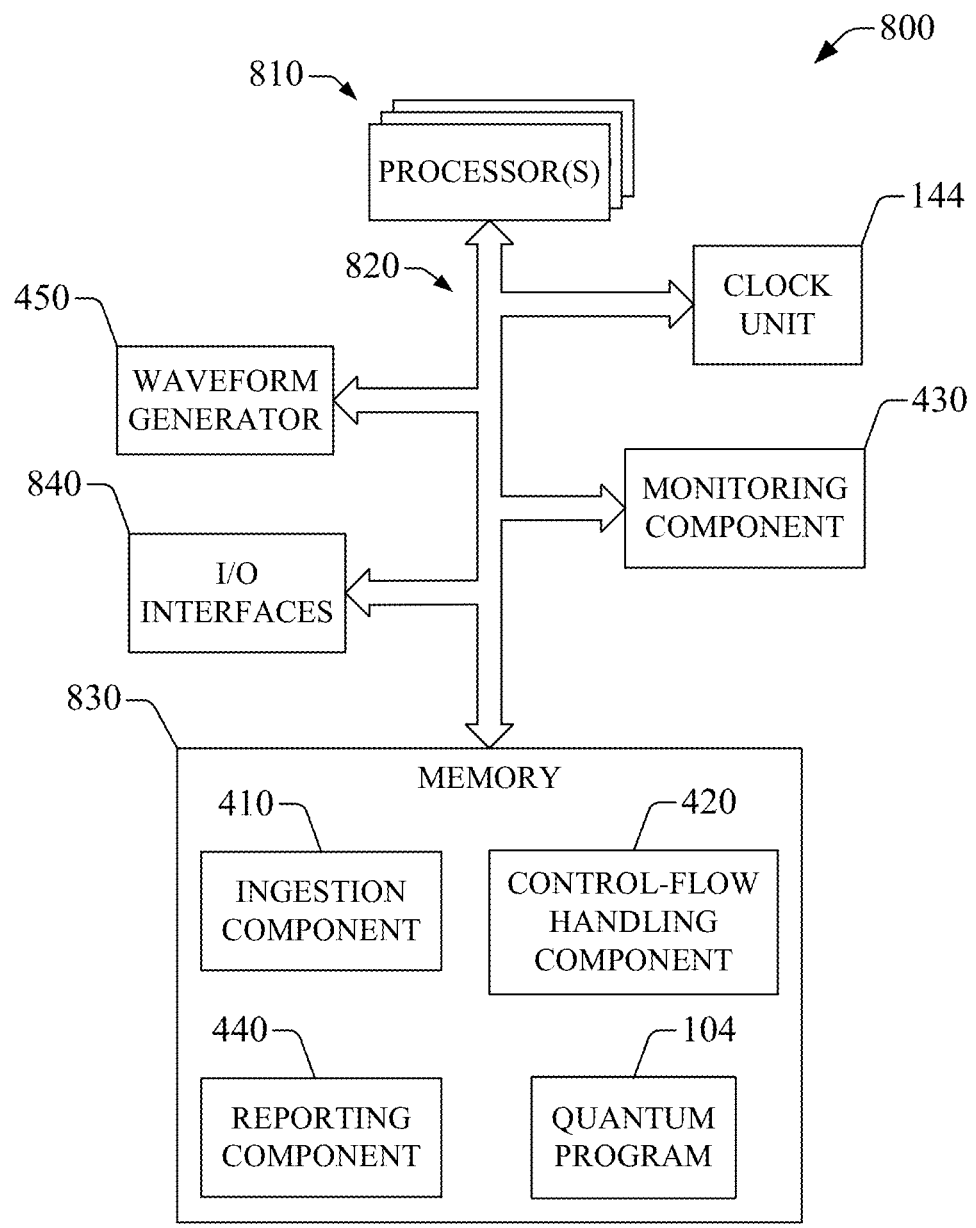
FIG. 8 illustrates a non-limiting example of a computing device for centralized control of execution of a quantum program, in accordance with one or more embodiments described herein.

FIG. 8 is a block diagram of a non-limiting example of a controller device 800 for centralized control of execution of a quantum program, in accordance with one or more embodiments described herein. The controller device 800 can embody, or can constitute, at least one of the controller devices 140 (FIG. 1) described herein. As is illustrated in FIG. 8, the controller device 800 can include one or several processors 810, one or several memory devices 830 (referred to as memory 830), the clock unit 144, and the waveform generator 450. In some embodiments, the processor(s) 810 can be embodied in a microprocessing unit (MPU) having one or many processing cores. In other embodiments, the processor(s) 810 can be embodied in special-purpose processing device having one or many processing cores.

The processor(s) 810 can be operatively coupled to the memory 830, the clock unit 144, the waveform generator 450, the monitoring component 430, and I/O interfaces 460 via one or several communication interfaces 820, for example. The communication interface(s) 820 can be suitable for the particular arrangement (localized or distributed) of the processor(s) 810. In some embodiments, the communication interface(s) 820 can include one or a combination of many bus architectures, such a low voltage differential signaling (LVDS), JESD204b, Ethernet-based industrial bus, a controller area network (CAN) bus, a Modbus, other types of fieldbus architectures, or the like. In addition, or in other embodiments, the communication interface(s) can include a wireless network and/or a wireline network having respective footprints. The I/O interfaces 840, individually or in a particular combination, permit sending data/signaling from and/or receiving data/signaling at the controller device 800. The I/O interfaces 840 can be addressed individually by the processor(s) 810. The I/O interfaces 840 can include serial ports, parallel ports, general-purposed I/O (GPIO) pins, or a combination of those.

The memory 830 can retain or otherwise store therein machine-accessible components (e.g., computer-readable and/or computer-executable components) and data in accordance with this disclosure. As such, in some embodiments, machine-accessible instructions (e.g., computer-readable and/or computer-executable instructions) embody or otherwise constitute each one of the machine-accessible components within the memory 830. The machine-accessible instructions can be encoded in the memory 830 and can be arranged to form each one of the machine-accessible components. The machine-accessible instructions can be built (e.g., linked and compiled) and retained in computer-executable form within the memory 830 or in one or several other machine-accessible non-transitory storage media. Specifically, as is shown in FIG. 8, in some embodiments, the machine-accessible components include the ingestion component 410, the control-flow handling component 420, the monitoring component 430, and the reporting component 440. The memory 830 also can include data that permits various of the functionalities described herein. For example, as is illustrated in FIG. 8, the memory 830 can retain the quantum program 104.

The machine-accessible components, individually or in a particular combination, can be accessed and executed by at least one of the processor(s) 810. In response to execution, each one of the machine-accessible components can provide the functionality described herein in connection with centralized control of execution of a quantum program. Accordingly, execution of the computer-accessible components retained in the memory 830 can cause the controller device 800 to operate in accordance with aspects described herein. More concretely, as an example, at least one of the processor(s) 810 can execute the machine-accessible components to cause the controller device 800 to perform one or a combination of techniques in accordance with aspects described herein.

Although not illustrated in FIG. 8, the controller device 800 also can include other types of computing resources that can permit or otherwise facilitate the execution of the machine-accessible components retained in the memory 830 and the reception and transmission of data and/or signaling. Those computing resources can include, for example, other memory, disk space, incoming bandwidth, and/or outgoing bandwidth, interface(s) (such as I/O interfaces); power supplies; and the like. For instance, the memory 830 also can include programming interface(s) (such as APIs); an operating system; software for configuration and or control of a virtualized environment; firmware; and similar.

Figure 9:
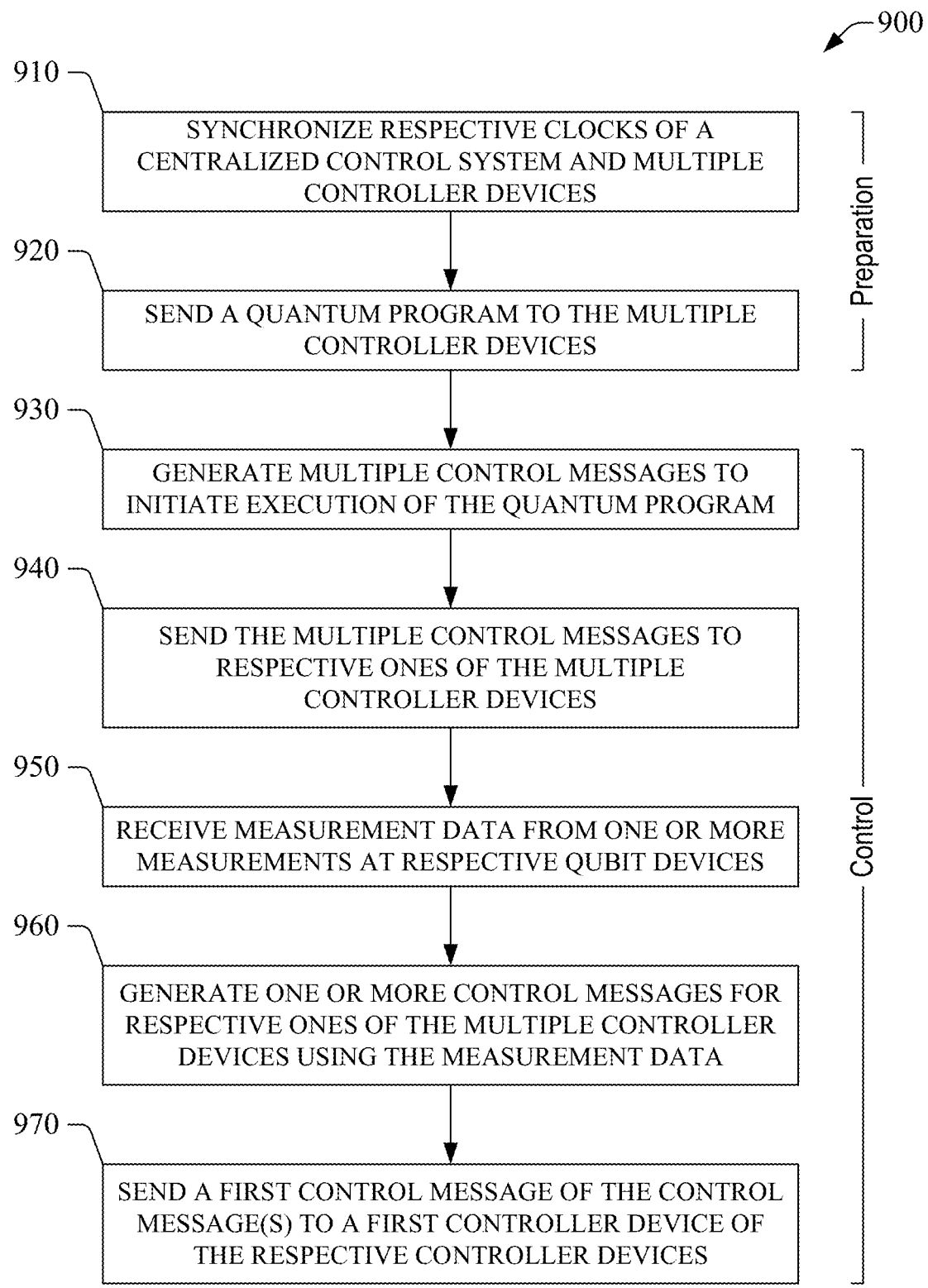
FIG. 9 illustrates a non-limiting example of a method for centralized control of execution of a quantum program, in accordance with one or more embodiments of this disclosure.

FIG. 9 illustrates an example of a method 900 for centralized control of execution of a quantum program, in accordance with one or more embodiments of this disclosure. A computing system can implement, entirely or partially, the example method 900. Implementing the computer-implemented method 900 can include compiling or executing, or both, one or several of the blocks included in the computer-implemented method 900, for example. The computing system can include, and/or can be operatively coupled to, one or several processors, one or several memory devices, other types of computing resources (such as communication interface(s)), a combination thereof, or other similar resources. The computing system can embody, or can include, a centralized control system. For example, the computing system can embody the control hub system 110 (FIG. 1).

At block 910, the computing system can synchronize respective clocks of the centralized control system and multiple controller devices remotely located relative to the centralized control system. As mentioned, a first controller device of the multiple controller devices can control application of a signal to a first qubit device of the multiple qubit devices, and a second controller device of the multiple controller devices can control application of a signal to a second qubit device of the multiple qubit devices. To synchronize those clocks, in some embodiments, the computing system can execute a synchronization component (e.g., synchronization component 310 (FIG. 3)) to start a clock unit of the centralized control system, and to direct the multiple controller devices to start respective clock units integrated therein, or functionally coupled thereto.

At block 920, the computing system can send a quantum program to the multiple controller devices. Sending the quantum program can include sending data defining the quantum program to each one of the multiple controller devices. In some embodiments, the computing system can execute a compilation component (e.g., compilation component 330 (FIG. 3)) to send such data to a controller device.

Block 910 and block 920 can collectively embody a preparation stage. Implementation of the preparation stage can initialize a control state of several controller devices to be controlled centrally.

At block 930, the computing system can generate multiple control messages to initiate execution of the quantum program. In some cases, because respective clocks of the multiple controller devices have been synchronized, each one of the multiple control messages can include payload data defining a particular time (such as a defined delay $\Delta t$ or a FAT $t_{FAT}$) to initiate execution of the quantum program. In some embodiments, the computing system can execute a composition component (e.g., composition component 320 (FIG. 3)) to generate the multiple control messages.

At block 940, the computing system can send the multiple control messages to respective ones of the multiple controller devices. The multiple control messages can be sent via respective high speed, non-blocking, point-to-point connections that functionally couple the multiple controller devices to the computing system. In some embodiments, the computing system can execute a messaging component (e.g., messaging component 340 (FIG. 3) to send the multiple control messages via those connections.

At block 950, the computing system can receive measurement data resulting from one or more measurements at respective qubit devices. In some embodiments, the computing system can receive the measurement data via an ingestion component (e.g., ingestion component 350 (FIG. 3)). A first controller device of the multiple controller devices can cause measurement of a state of a first qubit device or the respective qubit devices. Such a measurement can result in the first measurement data of the measurement data. The first controller device can then send the first measurement data to computing system.

At block 960, the computing system can generate, using the measurement data, one or more control messages for respective ones of the multiple controller devices. In some embodiments, the computing system can execute the composition component to generate the control message(s).

At block 970, the computing system can send a first control message of the control message(s) to a first controller device of the respective ones of the multiple controller devices. The computing system can send the first control message via the messaging component, for example, using a high-speed, non-blocking, point-to-point connection that functionally couples the first controller device and the computing system.

Blocks 930 to 970 can collectively embody a control stage. Implementation of the control stage can permit centrally controlling the execution of the quantum program.

Figure 10:
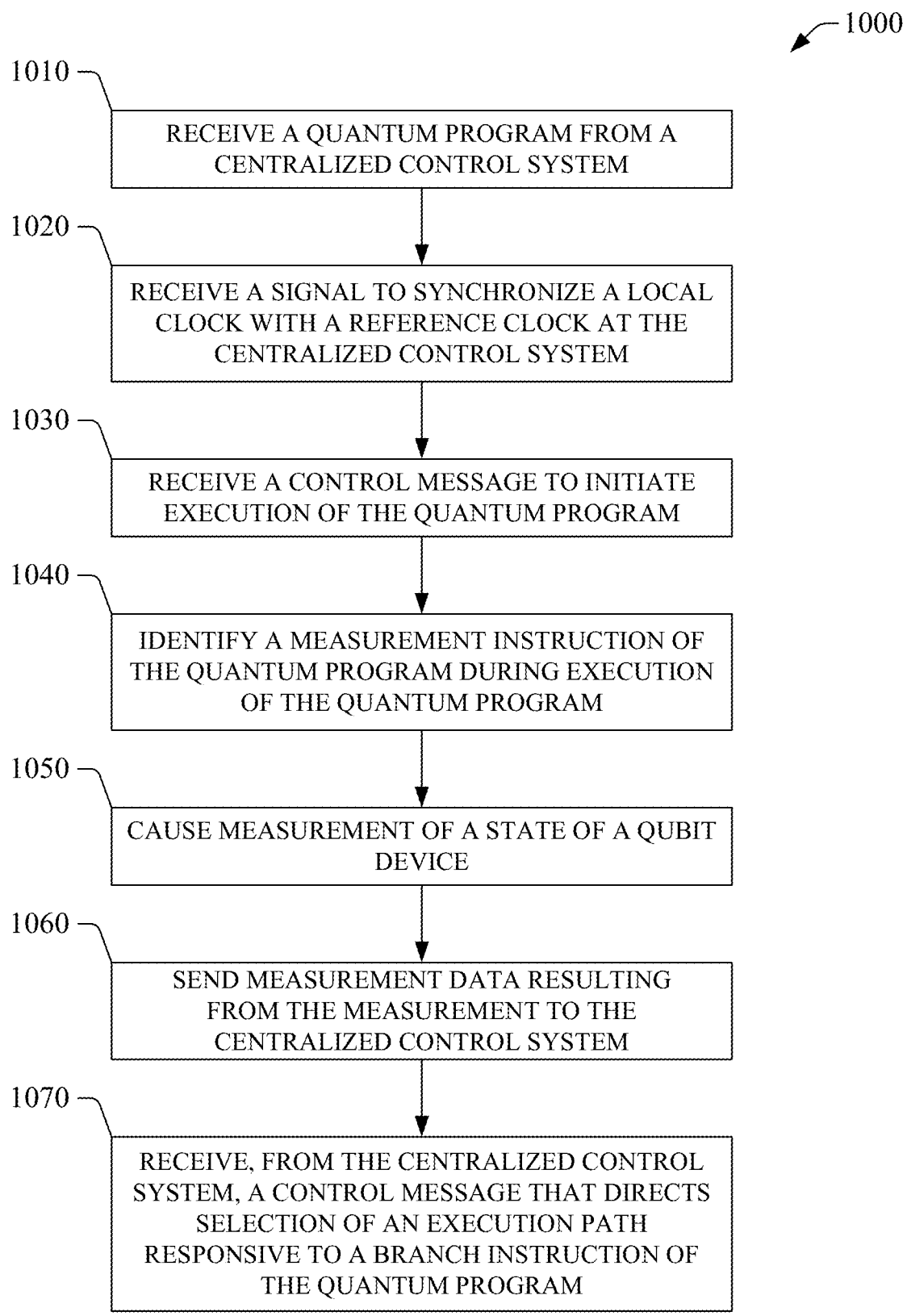
FIG. 10 illustrates a non-limiting example of a method for controlled execution of a quantum program, in accordance with one or more embodiments of this disclosure.

FIG. 10 illustrates an example of a method 1000 for controlled execution of a quantum program, in accordance with one or more embodiments of this disclosure. A computing device can implement, entirely or partially, the example method 1000. Implementing the computer-implemented method 1000 can include compiling or executing, or both, one or several of the blocks included in the computer-implemented method 1000, for example. The computing device can include, and/or can be operatively coupled to, one or several processors, one or several memory devices, other types of computing resources (such as communication interface(s)), a combination thereof, or other similar resources. The computing device can be functionally coupled to a computing system that embodies, or includes, a centralized control system. In some embodiments, the computing device embodies a qubit controller device (e.g., one of the controller devices 140 (FIG. 1)) and the computing system embodies the control hub system 110 (FIG. 1).

At block 1010, the computing device can receive a quantum program from a centralized control system (e.g., control hub system 110 (FIG. 1)) remotely located relative to the computing device. In some embodiments, the computing device can control application of a signal to a first qubit device of multiple qubit devices that execute the quantum program. Receiving the quantum program can include receiving data defining the quantum program. Such data can be received via a high speed, non-blocking, point-to-point connection between the computing device and the centralized control system. In some embodiments, the computing device can execute an ingestion component (e.g., ingestions component 410 (FIG. 4)) to receive the quantum program.

At block 1020, the computing device can receive a signal to synchronize a local clock with a reference clock at the centralized control system. The local clock can be integrated into the computing device. In other cases, the local clock can be functionally coupled to the computing device in a short-range wireline or wireless link. The local clock and the reference clock can be embodied in, or can constitute, the clock unit 144 (FIG. 1) and the clock unit 114 (FIG. 1), respectively.

At block 1030, the computing device can receive a control message to initiate execution of the quantum program. The control message can be received via a high speed, non-blocking, point-to-point connection between the computing device and the centralized control system. In some embodiments, the computing device can execute, or can continue executing, the ingestion component to receive the control message. The processor(s) can be embodied in, or can include, the processor(s) 460, and the waveform generator can be embodied in the waveform generator 450 (FIG. 4). In some cases, the processor(s) can include at least one microprocessor or at least one special-purpose processor.

At block 1040, the computing device can identify a measurement instruction of the quantum program during execution of the quantum program. In some embodiments, the computing device can execute a component (e.g., control-flow handling component 420 (FIG. 4)) to identify such an instruction.

At block 1050, the computing device can cause measurement of a state of the first qubit device and/or other physical properties of the first qubit device or an environment thereof. In some embodiments, the computing device can include a monitoring component (e.g., the monitoring component 430 (FIG. 4)) to cause the measurement of the state of the first qubit device and/or the other physical properties. In those embodiments, the component that identifies the measurement instruction also can direct the monitoring component to cause the measurement of the state of the first qubit device and/or the other physical properties.

At block 1060, the computing device can send, to the centralized control system, measurement data resulting from the measurement. To that end, in some embodiments, the computing device can execute a reporting component (e.g., reporting component 440 (FIG. 4)).

At block 1070, the computing device can receive, from the centralized control system, a control message that directs selection of an execution path responsive to a branch instruction of the quantum program. The branch instruction can be subsequent to the measurement instruction identified at block 1040. In some cases, the control message includes payload data defining the execution path. In addition, or in other cases, the control message also can include second payload data defining one or more operands corresponding to a quantum operation instruction within the execution path (such as node 510(4) in FIG. 5A). Further, in yet other cases, the control message can further include other payload data defining a FAT $t_{FAT}$ corresponding to a pause in the execution of the quantum program at the computing device. The pause can be common to other computing device(s) that also execute the quantum program concurrently with the computing device.

Figure 11:
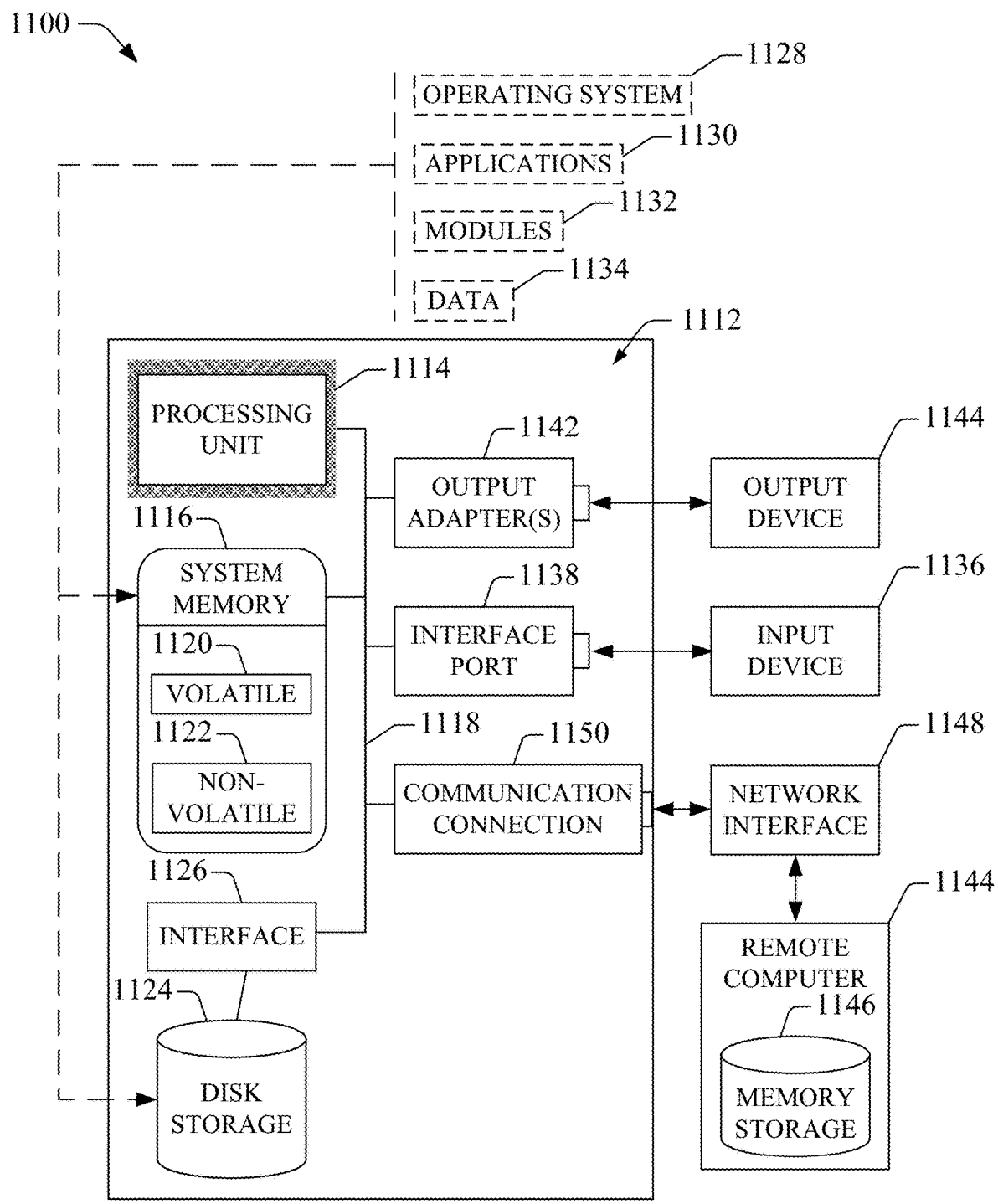
FIG. 11 is a block diagram of a non-limiting example of an operating environment in which one or more embodiments described herein can be implemented.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity. A suitable operating environment 1100 for implementing various aspects of this disclosure can include a computer 1112. The computer 1112 can also include a processing unit 1114, a system memory 1116, and a system bus 1118. The system bus 1118 can operably couple system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1116 can also include volatile memory 1120 and nonvolatile memory 1122. The basic input/output system (BIOS), containing the basic routines to transfer information between elements within the computer 1112, such as during start-up, can be stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface can be used, such as interface 1126. FIG. 11 also depicts software that can act as an intermediary between users and the basic computer resources described in the suitable operating environment 1100. Such software can also include, for example, an operating system 1128. Operating system 1128, which can be stored on disk storage 1124, acts to control and allocate resources of the computer 1112. System applications 1130 can take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through one or more input devices 1136. Input devices 1136 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1114 through the system bus 1118 via one or more interface ports 1138. The one or more Interface ports 1138 can include, for example, a serial port, a parallel port, a game port, and a universal serial bus (USB). One or more output devices 1140 can use some of the same type of ports as input device 1136. Thus, for example, a USB port can be used to provide input to computer 1112, and to output information from computer 1112 to an output device 1140. Output adapter 1142 can be provided to illustrate that there are some output devices 1140 like monitors, speakers, and printers, among other output devices 1140, which require special adapters. The output adapters 1142 can include, by way of illustration and not limitation, video and sound cards that provide a means of connection between the output device 1140 and the system bus 1118. It should be noted that other devices and/or systems of devices provide both input and output capabilities such as one or more remote computers 1144.

Computer 1112 can operate in a networked environment using logical connections to one or more remote computers, such as remote computer 1144. The remote computer 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer 1144. Remote computer 1144 can be logically connected to computer 1112 through a network interface 1148 and then physically connected via communication connection 1150. Further, operation can be distributed across multiple (local and remote) systems. Network interface 1148 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

In some embodiments, the control hub system 110 described herein can be associated with a cloud computing environment. For example, the control hub system 110 can be associated with a cloud computing environment 1250 included in the operational environment 1200 illustrated in FIG. 12, and/or with one or more functional abstraction layers described herein with reference to FIG. 13 (e.g., hardware and software layer 1360, virtualization layer 1370, management layer 1380, and/or workloads layer 1390).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
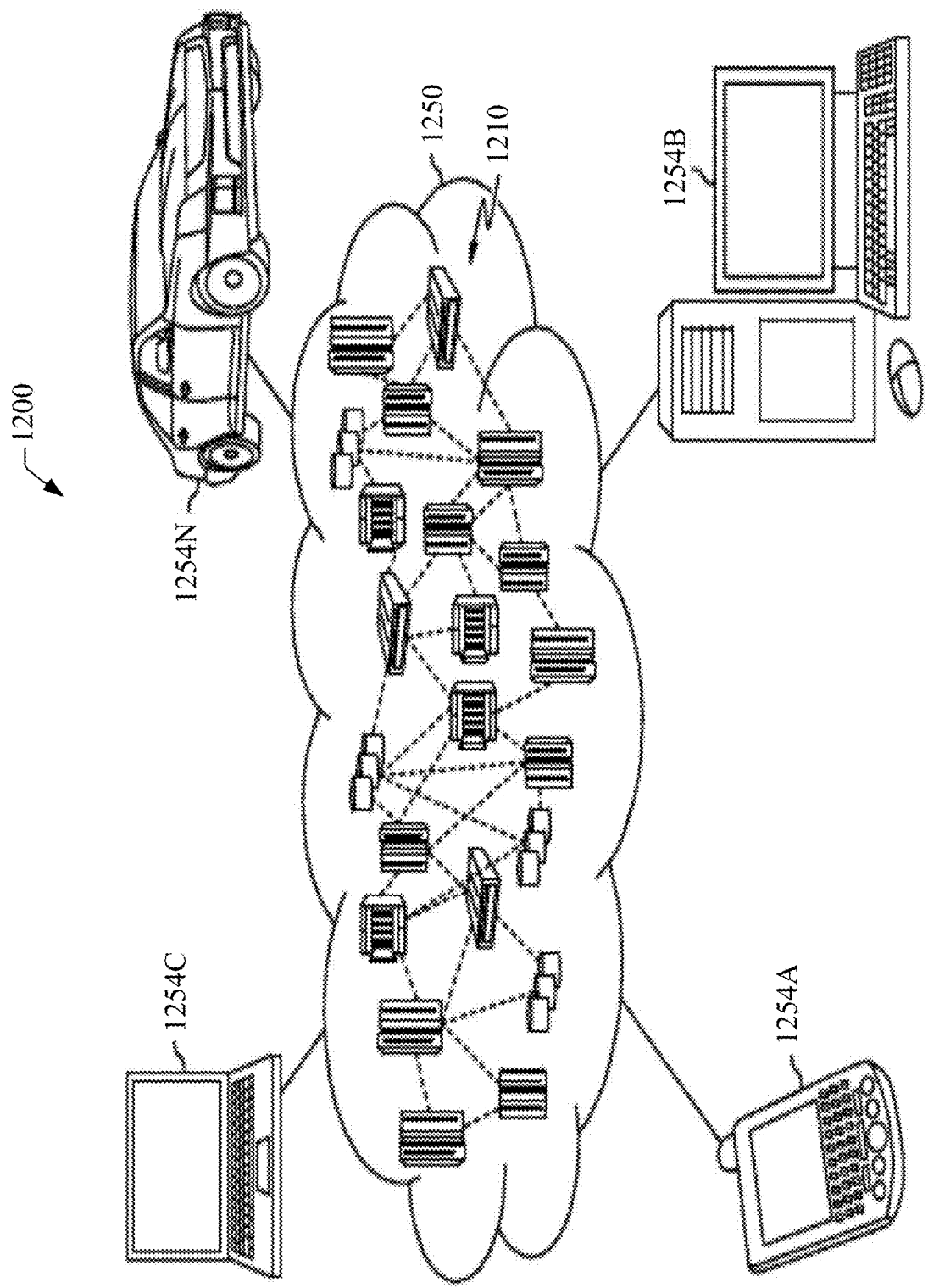
FIG. 12 is a block diagram of a non-limiting example of a cloud computing environment in accordance with one or more embodiments described herein.

Referring now to FIG. 12 an illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Although not illustrated in FIG. 12, cloud computing nodes 1210 can further comprise a quantum platform (e.g., quantum computer, quantum hardware, quantum software, and/or another quantum platform) with which local computing devices used by cloud consumers can communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
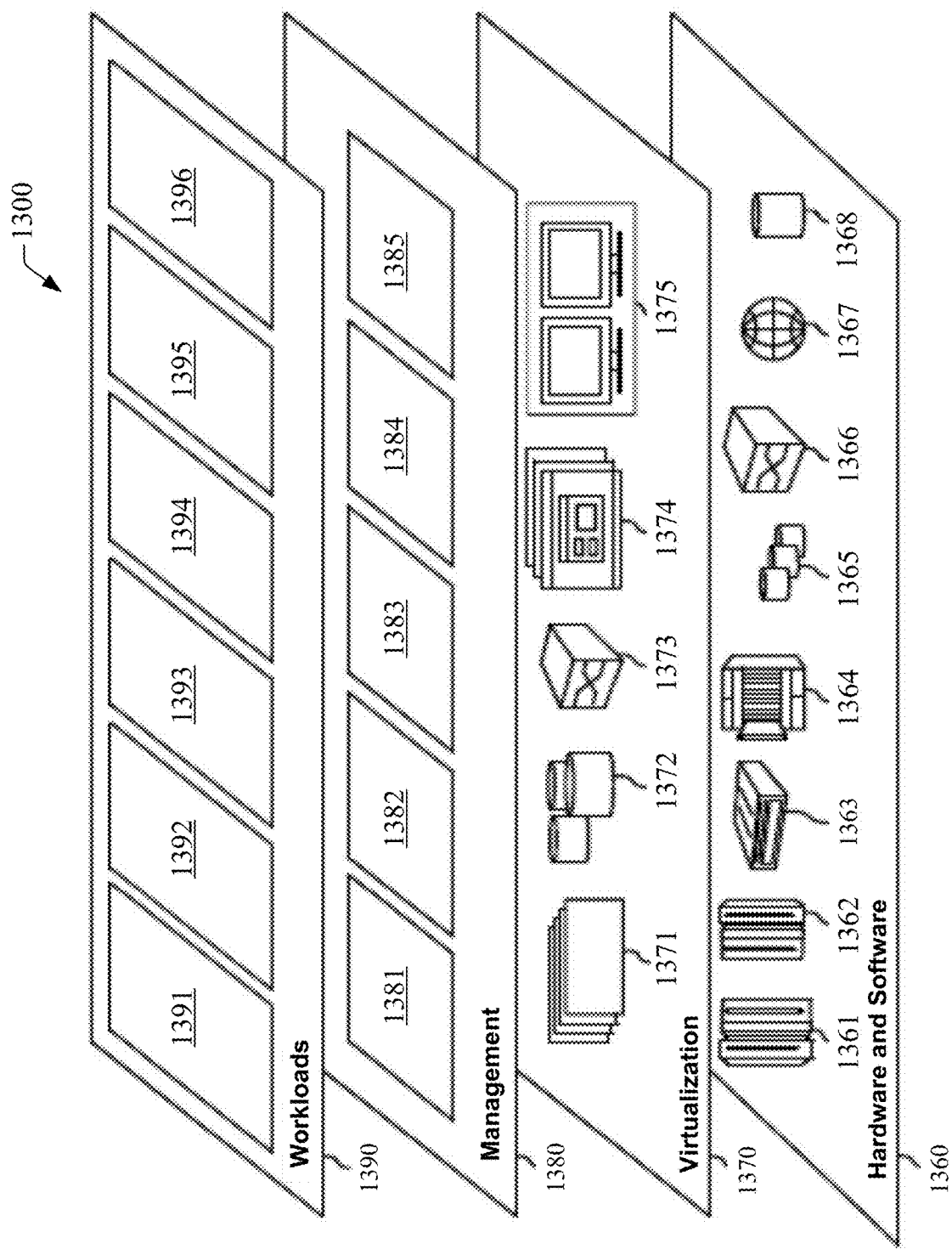
FIG. 13 is a block diagram of a non-limiting example of abstraction model layers in accordance with one or more embodiments described herein.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 include hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367, database software 1368, quantum platform routing software (not illustrated in FIG. 13), and/or quantum software (not illustrated in FIG. 13).

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Non-limiting examples of workloads and functions which may be provided from this layer include: mapping and navigation 1391; software development and lifecycle management 1392; virtual classroom education delivery 1393; data analytics processing 1394; transaction processing 1395; and vulnerability risk assessment software 1396.

Embodiments of the present invention may be a system, a method, an apparatus and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

In this disclosure, terms such as "store," "storage," "data store," data storage," "database," "repository," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executes computer-executable components stored in memory, the computer-executable components comprising,
      a synchronization component that causes multiple controller devices remotely located relative to the system to be synchronized with one another and the system;
      an ingestion component that accesses measurement data resulting from one or more measurements at respective qubit devices;
      a composition component that generates, using the measurement data, one or more control messages for respective second controller devices of the multiple controller devices, wherein a first controller device of the respective second controller devices controls application of a signal to a first qubit device of the respective qubit devices.

2. The system of claim 1, further comprising a messaging component that sends a first message of the one or more control messages to the first controller device via a high speed, non-blocking, point-to-point connection.

3. The system of claim 1, wherein the composition component generates a first message having at least one of first payload data defining an execution path for a branch instruction during execution of a quantum program at the first qubit device or second payload data defining operand data corresponding to one or more quantum operations within the execution path.

4. The system of claim 1, wherein the composition component generates a first message having payload data defining a future action time corresponding to a pause in execution of a quantum program.

5. The system of claim 1, further comprising a compilation component that sends data defining a quantum program to the multiple controller devices, wherein the multiple controller devices control application of respective signals to respective ones of multiple qubit devices including the respective qubit devices.

6. The system of claim 5, wherein the composition component generates multiple second control messages to initiate execution of the quantum program at the multiple qubit devices,
   the system further comprising a messaging component that sends a first one of the multiple messages to a first one of the multiple controller devices via a high speed, non-blocking, point-to-point connection.

7. The system of claim 6, further comprising a communication network that functionally couples the system and the first one of the multiple controller devices via a first high speed, non-blocking, point-to-point connection, and further functionally couples the system and a second one of the multiple controller devices via a second high speed, non-blocking, point-to-point connection.

8. A computer-implemented method, comprising:
   causing, by a system operatively coupled to a processor, multiple controller devices remotely located relative to the system to be synchronized with one another and the system;
   accessing, by the system, measurement data resulting from one or more measurements at respective qubit devices;
   generating, by the system, using the measurement data, one or more control messages for respective second controller devices of the multiple controller devices, wherein a first controller device of the respective second controller devices controls application of a signal to a first qubit device of the respective qubit devices.

9. The computer-implemented method of claim 8, further comprising sending, by the system, a first message of the one or more control messages to the first controller device via a high speed, non-blocking, point-to-point connection.

10. The computer-implemented method of claim 8, wherein generating the one or more control messages comprises generating a first message having at least one of first payload data defining an execution path for a branch instruction during execution of a quantum program at the first qubit device or second payload data defining operand data corresponding to one or more quantum operations within the execution path.

11. The computer-implemented method of claim 8, wherein generating the one or more control messages comprises generating a first message having payload data defining a future action time corresponding to a pause in execution of a quantum program.

12. The computer-implemented method of claim 8, further comprising generating multiple second control messages to initiate execution of a quantum program at multiple qubit devices comprising the respective qubit devices, the computer-implemented method further comprising,
   sending, by the system, a first one of the multiple messages to a first one of the multiple controller devices via a high speed, non-blocking, point-to-point connection, wherein the multiple controller device control application of respective signals to respective ones of the multiple qubit devices.

13. A computer program product for control of execution of a quantum program, the computer program product comprising a computer-readable storage medium having program instructions embodied therewith, the program instructions executable by a processor to cause the processor to:
   cause, by the processor, multiple controller devices remotely located relative to the processor to be synchronized with one another and a computing system operatively coupled to the processor;
   access, by the processor, measurement data resulting from one or more measurements at respective qubit devices;
   generate, by the processor, using the measurement data, one or more control messages for respective second controller devices of the multiple controller devices, wherein a first controller device of the respective second controller devices controls application of a signal to first qubit device of the respective qubit devices.

14. The computer program product of claim 13, wherein the program instructions are further executable by the processor to cause the processor to send a first message of the one or more control messages to the first controller device via a high speed, non-blocking, point-to-point connection.

15. The computer program product of claim 13, wherein generating the one or more control messages comprises generating a first message having at least one of first payload data defining an execution path for a branch instruction during execution of the quantum program at the first qubit device or second payload data defining operand data corresponding to one or more quantum operations within the execution path.

16. The computer program product of claim 13, wherein generating the one or more control messages comprises generating a first message having payload data defining a future action time corresponding to a pause in execution of a quantum program.

17. The computer program product of claim 13, wherein the program instructions are further executable by the processor to cause the processor to generate multiple second control messages to initiate execution of the quantum program at the multiple qubit devices, and wherein the program instructions are still further executable by the processor to cause the processor to send a first one of the multiple second control messages to a first one of the multiple controller devices via a high speed, non-blocking, point-to-point connection, and wherein the multiple controller devices control application of respective signal to respective ones of the multiple qubit devices.

18. A device, comprising:
a clock unit that receives a clocking signal from a computing system remotely located relative to the device, the clocking signal synchronizes the device with multiple second devices remotely located relative to the device; and
a processor that executes computer-executable components stored in memory, the computer-executable components comprising,
an ingestion component that receives data defining a quantum program from the computing system, wherein the device controls application of a signal to a first qubit device of multiple qubit devices; and
a control-flow handling component that identifies a measurement instruction of the quantum program during execution of the quantum program, and
directs a monitoring component to causes measurement of at least one of a state of the first qubit device or a physical property of the first qubit device.

19. The device of claim 18, the computer-executable components further comprising a reporting component that sends measurement data resulting from the measurement to the computing system via a high speed, non-blocking, point-to-point connection.

20. The device of claim 19, wherein the ingestion component receives, from the computing system, a control message having at least one of first payload data defining an execution path responsive to the branch instruction or second payload data defining operand data corresponding to one or more quantum operations within the execution path.

21. The device of claim 20, wherein the control message further comprises second payload data defining a future action time corresponding to a pause in execution of a quantum program.

22. A computer-implemented method, comprising:
receiving, by a controller device having at least one processor, a clocking signal from a computing system remotely located relative to the controller device, the clocking signal synchronizes the device with multiple second devices remotely located relative to the device
receiving, by a controller device having at least one processor, data defining a quantum program from the computing system, wherein the controller device controls application of a signal to a first qubit device of multiple qubit devices that execute the quantum program;
identifying, by the controller device, a measurement instruction of the quantum program during execution of the quantum program; and
causing, by the controller device, measurement of at least one of a state of the first qubit device or a physical property of the first qubit device.

23. The computer-implemented method of claim 22, further comprising sending, by the controller device, measurement data resulting from the measurement to the computing system via a high speed, non-blocking, point-to-point connection.

24. The computer-implemented method of claim 23, further comprising receiving, by the controller device, from the computing system, a control message having at least one of first payload data defining an execution path responsive to the branch instruction or second payload data defining operand data corresponding to one or more quantum operations within the execution path.

25. The computer-implemented method of claim 24, wherein the control message further comprises third payload data defining a future action time corresponding to a pause in execution of a quantum program.

* * * * *